(12) United States Patent
Okoshi

(10) Patent No.: US 8,381,433 B2
(45) Date of Patent: Feb. 26, 2013

(54) GRAFTED SEEDLING PRODUCING DEVICE

(75) Inventor: Takahiro Okoshi, Ehime-ken (JP)

(73) Assignee: Iseki & Co., Ltd., Matsuyama-shi (JP)

( * ) Notice: Subject to any disclaimer, the term of this patent is extended or adjusted under 35 U.S.C. 154(b) by 277 days.

(21) Appl. No.: 12/956,261

(22) Filed: Nov. 30, 2010

(65) Prior Publication Data

US 2011/0154730 A1 Jun. 30, 2011

(30) Foreign Application Priority Data

Dec. 28, 2009 (JP) ................................. 2009-296900

(51) Int. Cl.
*A01G 1/00* (2006.01)
(52) U.S. Cl. .............................................. 47/6
(58) Field of Classification Search ................ 47/1.01 P, 47/6, 7
See application file for complete search history.

(56) References Cited

U.S. PATENT DOCUMENTS 6,148,560 A * 11/2000 Hagen et al. ........................ 47/6
7,430,971 B2 10/2008 Kobayashi et al.

FOREIGN PATENT DOCUMENTS

| JP | 6-7033 | 1/1994 |
| JP | 7-31279 | 2/1995 |
| JP | 9-294469 | 11/1997 |
| JP | 3010775 | 12/1999 |
| JP | 3223578 | 8/2001 |
| JP | 3620201 | 11/2004 |
| JP | 2006-238805 | 9/2006 |
| JP | 2006-238806 | 9/2006 |
| JP | 2008-187964 | 8/2008 |

* cited by examiner

*Primary Examiner* — Monica Williams
(74) *Attorney, Agent, or Firm* — Oblon, Spivak, McClelland, Maier & Neustadt, L.L.P.

(57) ABSTRACT

A grafted seedling producing device including a stock seedling holding unit that holds and conveys a stock seedling, a stock cutting unit that cuts the stock seedling held by the stock seedling holding unit, and a joining unit that joins the stock seedling conveyed by the stock seedling holding unit and a scion seedling, the stock cutting unit including a stock cutter unit that includes a stock blade for cutting the stock seedling by a predetermined stock cutter trajectory, the stock seedling holding unit holding an embryonic stem of a seedling for grafting at a predetermined position on the stock cutter trajectory in a vertical posture, the grafted seedling producing device includes: a supporting unit configured to retract the stock cutter unit from an advance position for cutting in proximity to the stock seedling holding unit; and a stock pressing member that presses and fixes a portion ahead of a cutting position of the embryonic stem from a seedling holding position against the stock seedling holding unit side at the advance position.

10 Claims, 31 Drawing Sheets

FIG.11A
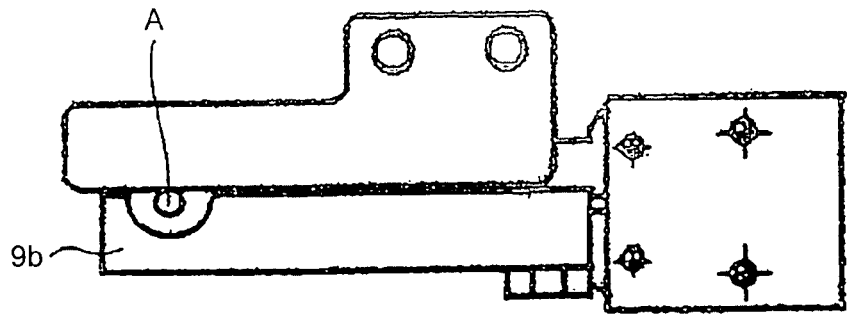
FIG.11B
FIG.12
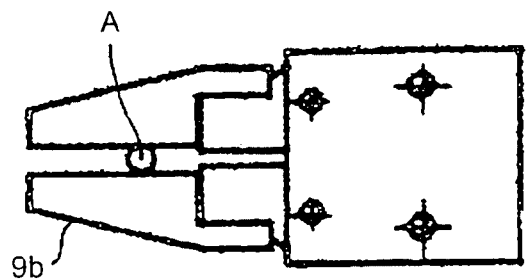
| CYLINDER \ PROCESS | 1 | 2 | 3 | 4 | 5 |
|---|---|---|---|---|---|
| HOLDING ARM | ● | ● | ○ | ○ | ○ |
| CUTTING ARM | ● | ● | ○ | ○ | ○ |
| SUPPLY ARM | ○ | ● | ● | ● | ● |
| AUXILIARY ARM | ○ | ● | ● | ○ | ● |
CLOSE ●
OPEN ○

(VIEW IN DIRECTION OF ARROW A)

(VIEW IN DIRECTION OF ARROW B)

FIG.30
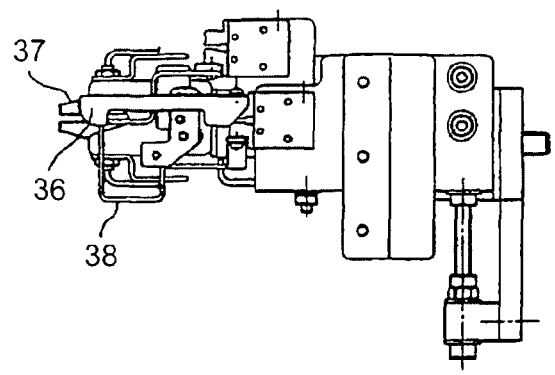
(S1-S1 CROSS SECTION)
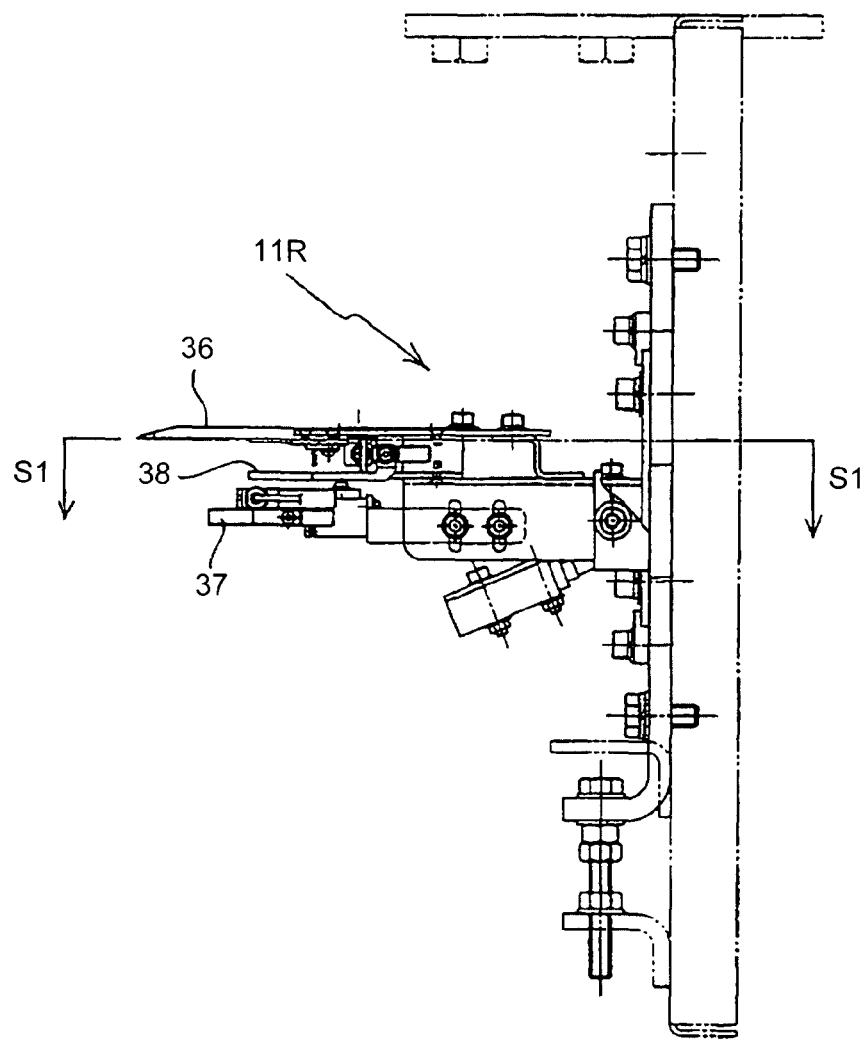

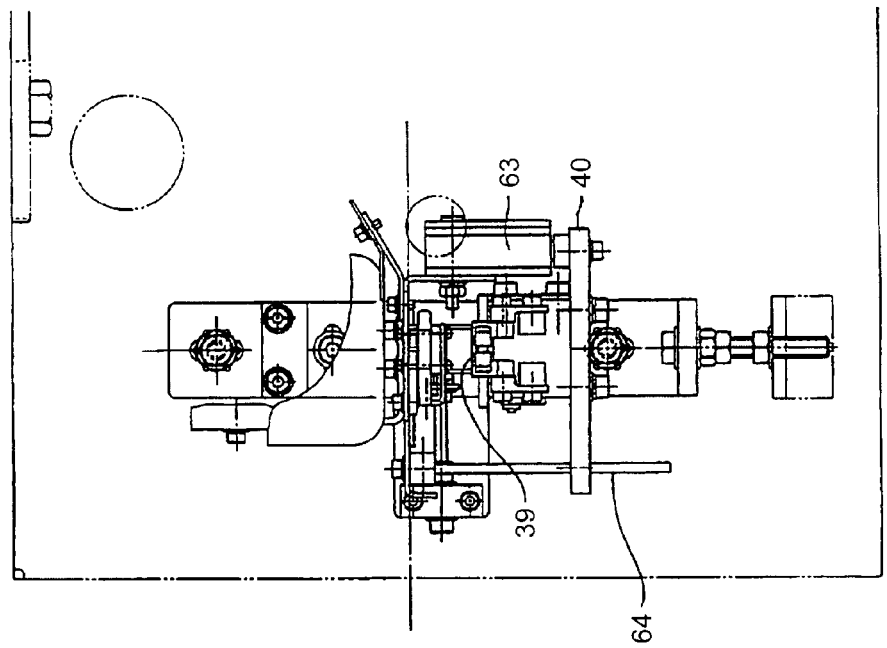
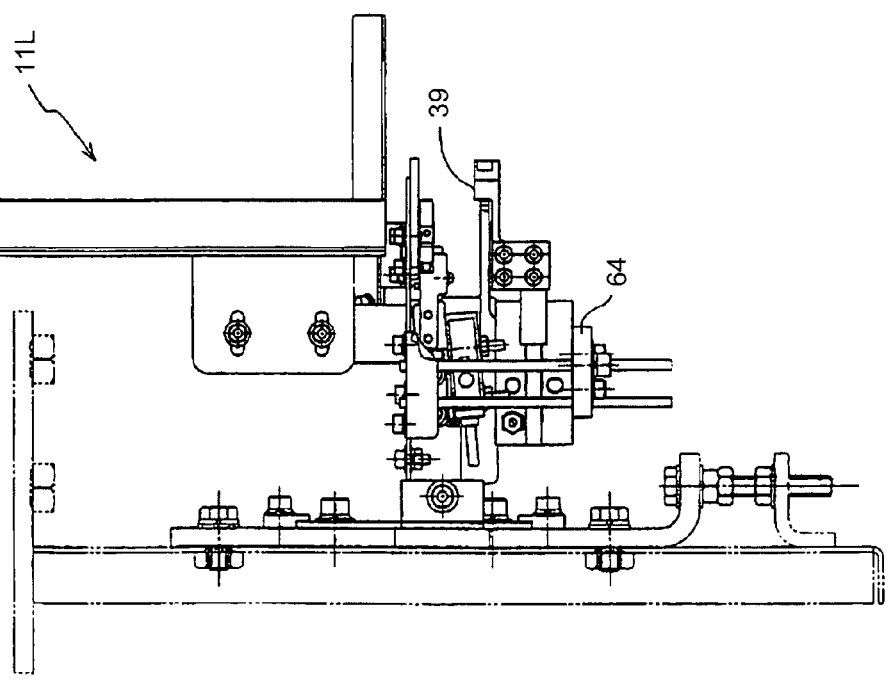

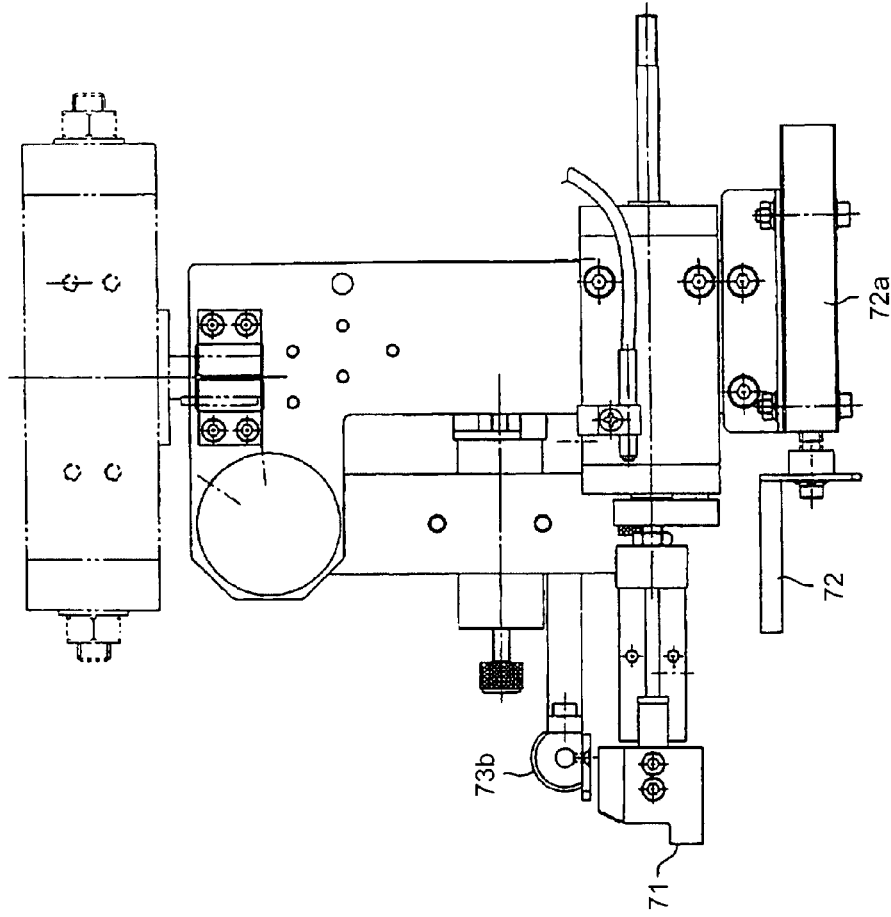
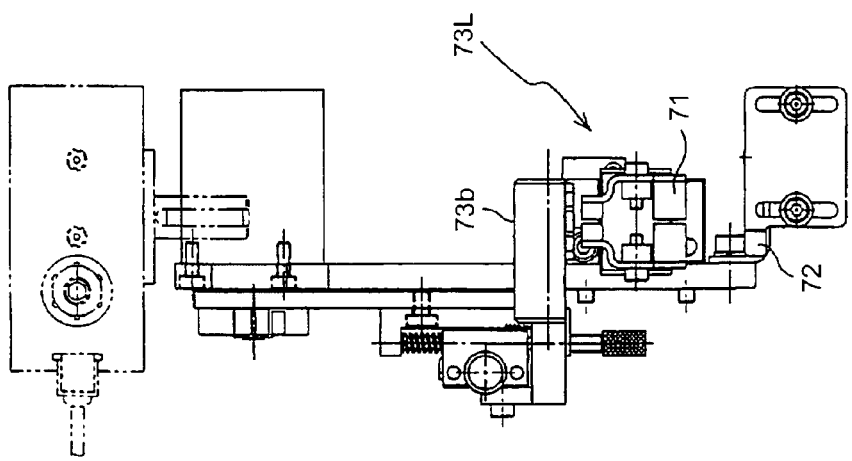

GRAFTED SEEDLING PRODUCING DEVICE

BACKGROUND OF THE INVENTION

1. Field of the Invention

The present invention relates to a grafted seedling producing device for cutting a seedling to graft a stock and a scion in a grafted seedling processing apparatus.

2. Description of the Related Art

As shown in FIG. 1 of Japanese Patent Application Laid-open No. H06-7033, there has been known an apparatus as a grafted seedling processing apparatus, which is configured in such a manner that left and right cutting processing units are arranged in the middle of conveying trips of left and right conveying arms, respectively, in which the left and right conveying arms make rotations to convey a seedling to be used as a stock and a seedling to be used as a scion held at side supply bases that serve as seedling receiving holders respectively arranged at the left and the right sides to a joining unit at the center and configured to operate in such a manner that a rotating cutter operates at each of the cutting processing units when the seedling reaches the cutting processing unit by the conveying arm.

In the cutting processing unit, it is possible to set a distance from the conveying arm, a position of height of a cutting plane, and an inclination angle of the cutting plane by adjusting a trajectory of the rotating cutter for each of the stock and the scion. Therefore, it is possible to perform full automatic grafted seedling processing by cutting embryonic stems of the seedlings respectively held at the left and right conveying arms at positions close to binding edges and joining the seedlings with a clip after aligning both cutting planes at the joining unit at a subsequent stage.

However, even though the trajectory of the rotating cutter of the cutting processing unit is adjusted in a fine manner for each of the stock and the scion, there has been a problem that both cutting planes are not tightly joined with each other when joining the stock and the scion because the cutting planes are unstable, which causes a joining failure of the grafted seedling.

SUMMARY OF THE INVENTION

An object of the present invention is to provide a grafted seedling producing device with which it is possible to align cutting planes in an accurate manner when joining seedlings by cutting them in a precise manner and to increase a proportion of grafted seedlings with satisfactory joining by preventing a joining failure of the grafted seedling.

According to an aspect of the present invention, a grafted seedling producing device including a stock seedling holding unit that holds and conveys a stock seedling, a stock cutting unit that cuts the stock seedling held by the stock seedling holding unit, and a joining unit that joins the stock seedling conveyed by the stock seedling holding unit and a scion seedling, the stock cutting unit including a stock cutter unit that includes a stock blade for cutting the stock seedling by a predetermined stock cutter trajectory, the stock seedling holding unit holding an embryonic stem of a seedling for grafting at a predetermined position on the stock cutter trajectory in a vertical posture, the grafted seedling producing device includes: a supporting unit configured to retract the stock cutter unit from an advance position for cutting in proximity to the stock seedling holding unit; and a stock pressing member that presses and fixes a portion ahead of a cutting position of the embryonic stem from a seedling holding position against the stock seedling holding unit side at the advance position.

According to another aspect of the present invention, a grafted seedling producing device including a scion seedling holding unit that holds and conveys a scion seedling, a scion cutting unit that cuts the scion seedling held by the scion seedling holding unit, and a joining unit that joins the scion seedling conveyed by the scion seedling holding unit and a stock seedling, the scion cutting unit including a scion cutter unit that includes a scion blade for cutting the scion seedling by a predetermined scion cutter trajectory, the scion seedling holding unit holding an embryonic stem of a seedling for grafting at a predetermined position on the scion cutter trajectory in a vertical posture, the grafted seedling producing device includes: a supporting unit configured to retract the scion cutter unit from an advance position for cutting in proximity to the scion seedling holding unit; and a scion pressing member that presses and fixes a portion ahead of a cutting position of the embryonic stem from a seedling holding position against the scion seedling holding unit side at the advance position.

Advantageously, in the grafted seedling producing device, each of the stock cutting unit and the scion cutting unit is configured to cut the embryonic stem at a portion near the seedling holding position, in the stock cutting unit, the stock blade cuts the embryonic stem by an upward movement on the stock cutter trajectory in an inclined straight line shape, and in the scion cutting unit, the scion blade cuts the embryonic stem by a downward movement on the scion cutter trajectory in an inclined straight line shape.

Advantageously, in the grafted seedling producing device, the stock seedling holding unit includes an arm that presses a cotyledon from above on an embryonic stem receiving portion, and a leaf blowing guide that receives and blows an unnecessary leaf that is cut by the stock blade of the stock cutting unit.

Advantageously, in the grafted seedling producing device, the joining unit is configured to join the stock seedling and the scion seedling with a clip supplied from a clip supply unit, and the joining unit includes a correction and prevention guide that performs an operation of correcting and preventing a position misalignment of the seedling and the clip by having a contact with a distal end of the clip supplied from the clip supply unit.

Advantageously, the grafted seedling producing device further includes a loading unit for loading the stock seedling or a loading unit for loading the scion seedling. The loading unit includes a conveying mechanism that conveys a cell tray in which a plurality of seedlings are arranged sequentially by an arrangement pitch, a holding arm that fetches a seedling conveyed by the conveying mechanism, and a lateral conveying mechanism that moves the holding arm, the holding arm holds an embryonic stem of the seedling in a state of having a space for accommodating it in a rotatable manner, the lateral conveying mechanism is configured to supply the seedling held by the holding arm to a main unit for grafting the scion seedling and the stock seedling. The grafted seedling producing device further includes: a supply arm that receives the seedling from the holding arm; and a shutter that corrects a direction of a cotyledon of the seedling with a swing operation of the holding arm when the supply arm receives the seedling, and the shutter includes a weight and is configured to rotate around an upper supporting point, being provided at a position where the shutter moves by opening and closing of the holding arm.

Advantageously, the grafted seedling producing device further includes a loading unit for loading the stock seedling or a loading unit for loading the scion seedling. The loading unit includes a conveying mechanism that conveys a cell tray in which a plurality of seedlings are arranged sequentially by an arrangement pitch, a holding arm that fetches a seedling conveyed by the conveying mechanism, and a lateral conveying mechanism that moves the holding arm, the holding arm holds an embryonic stem of the seedling in a state of having a space for accommodating it in a rotatable manner, the lateral conveying mechanism is configured to supply the seedling held by the holding arm to a main unit for grafting the scion seedling and the stock seedling. The grafted seedling producing device further includes: a supply arm that receives the seedling from the holding arm; and an aligning plate and a second aligning plate for aligning a direction of a cotyledon of the seedling with a swing operation of the holding arm when the supply arm receives the seedling, and when aligning the direction of the cotyledon of the seedling exclusively with the aligning plate, the grafted seedling producing device further comprises a hoist cylinder that retracts the second aligning plate from a conveying area of the seedling by the holding arm.

Advantageously, the grafted seedling producing device further includes a loading unit for loading the stock seedling and a loading unit for loading the scion seedling. The loading unit includes a conveying mechanism that conveys a cell tray in which a plurality of seedlings are arranged sequentially by an arrangement pitch, a holding arm that fetches a seedling conveyed by the conveying mechanism, and a lateral conveying mechanism that moves the holding arm, the holding arm holds an embryonic stem of the seedling in a state of having a space for accommodating it in a rotatable manner, the lateral conveying mechanism is configured to supply the seedling held by the holding arm to a main unit for grafting the scion seedling and the stock seedling. The grafted seedling producing device further includes: a supply arm that receives the seedling from the holding arm; and an aligning plate for aligning a direction of a cotyledon of the seedling with a swing operation of the holding arm when the supply arm receives the seedling, and number of swings of the holding arm is configured to be set separately for the stock side and the scion side.

Advantageously, the grafted seedling producing device further includes a loading unit for loading the stock seedling and a loading unit for loading the scion seedling. The loading unit includes a conveying mechanism that conveys a cell tray in which a plurality of seedlings are arranged sequentially by an arrangement pitch, a holding arm that fetches a seedling conveyed by the conveying mechanism, and a lateral conveying mechanism that moves the holding arm, the holding arm holds an embryonic stem of the seedling in a state of having a space for accommodating it in a rotatable manner, the lateral conveying mechanism is configured to supply the seedling held by the holding arm to a main unit for grafting the scion seedling and the stock seedling. The grafted seedling producing device further includes: a supply arm that receives the seedling from the holding arm; and an aligning plate for aligning a direction of a cotyledon of the seedling with a swing operation of the holding arm when the supply arm receives the seedling, arranged in an inclined manner with a lower portion on the holding arm side and an upper portion an opposite side to the holding arm.

Advantageously, in the grafted seedling producing device, further includes a scion seedling supply base that is configured with a supply arm on an upper side and an auxiliary arm on a lower side for holding the seedling. A holding of the supply arm and the auxiliary arm is configured to be released at a time when the scion seedling holding unit starts to be stretched to hold the seedling, the grafted seedling producing device further comprises a scion seedling guide that keeps a position of the embryonic stem from being misaligned from a release of the holding of the holding of the supply arm and the auxiliary arm until the scion seedling holding unit holds the scion seedling, the scion seedling guide is configured to become active from an opposite side to the scion seedling holding unit on the seedling before the scion seedling holding unit holds the scion seedling, an inactive when the scion seedling holding unit completely moves away from the scion seedling supply base after holding the scion seedling.

Advantageously, in the grafted seedling producing device, the stock seedling holding unit includes a conveying arm and a seedling guide that can be stretched and retracted by a cylinder down the conveying arm (73*a*), the seedling guide is configure to position the seedling by having a contact with the embryonic stem of the seedling when receiving the seedling from a stock seedling supply base in a stretched state, prevent bending of the embryonic stem of the seedling and a position misalignment when cutting the seedling in a state of having a contact with the embryonic stem, become a bumping plate for preventing the embryonic stem of the seedling from separating when cutting a root by a root cutting device, and move away from the seedling in a retracted state when joining the seedlings.

BRIEF DESCRIPTION OF THE DRAWINGS

FIG. 11A is a schematic diagram of a supply arm of the relay unit;

FIG. 11B is a schematic diagram of an auxiliary arm of the relay unit;

FIG. 12 is a process chart of a delivery operation;

FIG. 30 is a side view of the seedling supply base lower unit for the scion seedling with a cross-section cut in a line S1-S1;

FIG. 31A is a side view of a seedling supply base for the stock seedling;

FIG. 31B is a front view of the seedling supply base for the stock seedling;

FIG. 32A is a front view of a rotary conveying unit;

FIG. 32B is a side view of the rotary conveying unit;

DETAILED DESCRIPTION OF THE PREFERRED EMBODIMENTS

Exemplary embodiments of a grafted seedling producing device according to the present invention will be explained below in detail with reference to the accompanying drawings. The following embodiments are only exemplary and the appended claims are not limited thereto.

An overall configuration of a grafted seedling producing device as a grafted seedling processing unit subject to an application of the present invention is explained below with reference to accompanying drawings.

Figure 1:
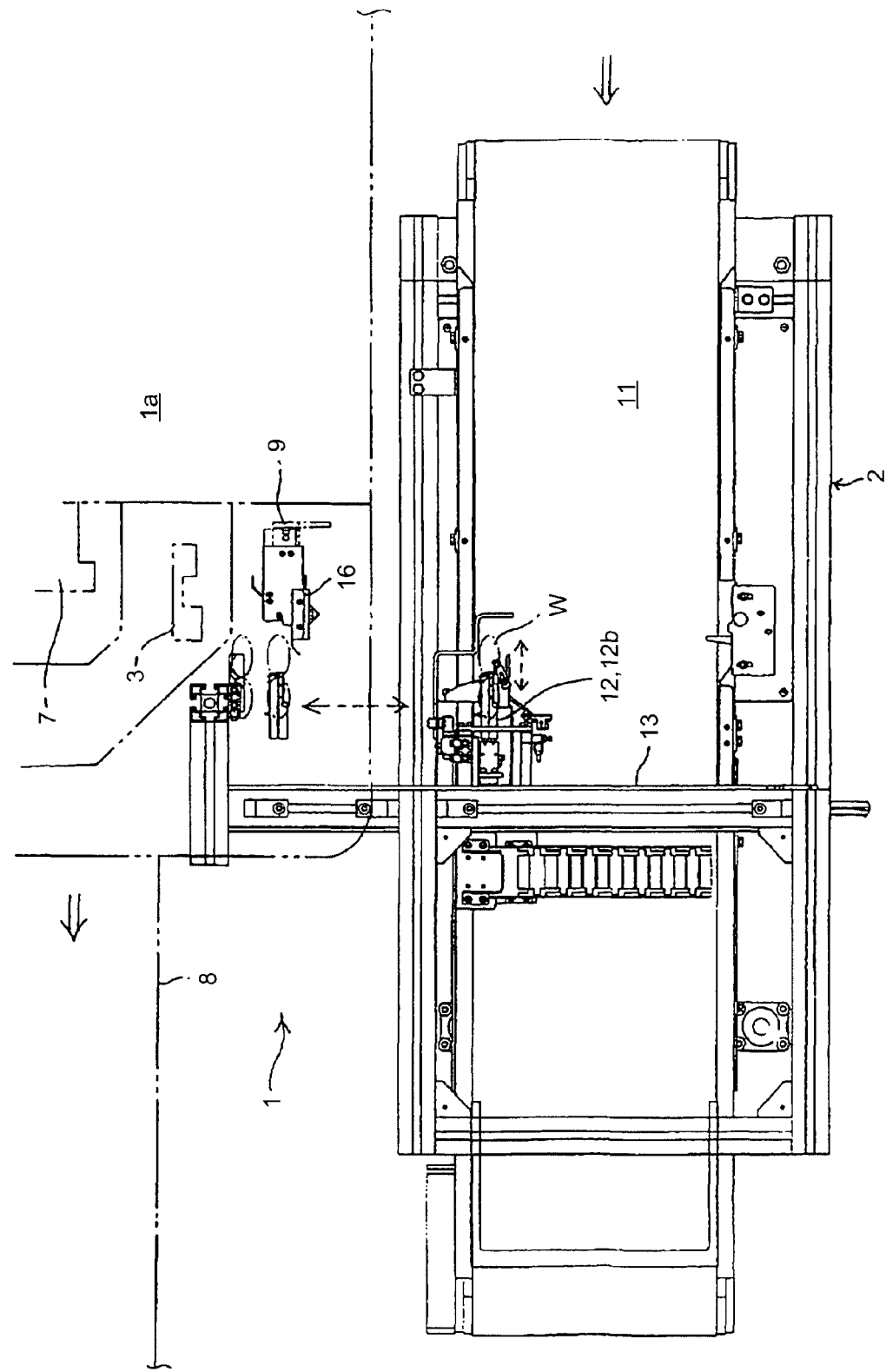
FIG. 1 is a plan view of relevant parts of a grafted seedling producing device.
Figure 2:
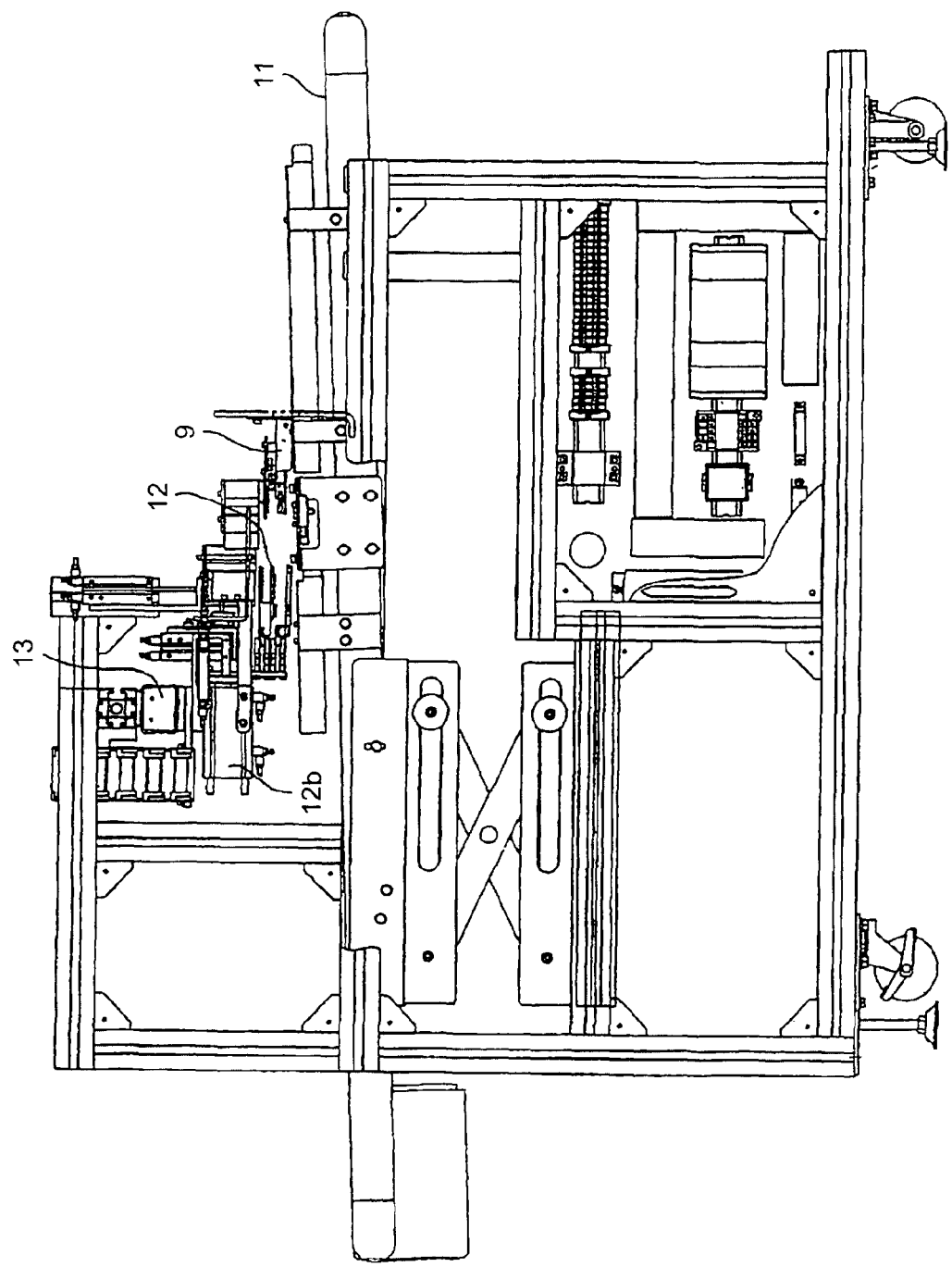
FIG. 2 is a side view of the grafted seedling producing device.

FIGS. 1 and 2 are a plan view and a side view of a right half of a grafted seedling producing device 1 according to an embodiment of the present invention, respectively.

The grafted seedling producing device 1 is configured in a substantially symmetric manner with respect to a grafting robot main unit 1a that performs a grafting of a scion and a stock by symmetrically arranging, at both sides of the grafting robot main unit 1a (FIG. 1 depicts only a half portion at the near side), left and right loading units 2 and 2 that respectively loads grafting seedlings, left and right pre-processing units 3 and 3 that respectively pre-processes the grafting seedlings received from the loading units 2 and 2, a joining processing unit 7 that receives a scion and a stock that are pre-processed and joins the scion and stock, and a grafted seedling delivery unit 8 that delivers a grafted seedling obtained by joining the scion and the stock toward a front side of a machine body. Furthermore, left and right relay units 9 and 9 for temporarily storing seedlings W for grafting are arranged to deliver the seedlings W respectively between the left and right loading units 2 and 2 and the left and right pre-processing units 3 and 3.

In a side that handles the scion in a configuration of both left and right sides of the machine body (the drawing exemplifies a right side), the loading unit 2 includes a conveying mechanism 11 that sequentially conveys a scion seedling W to the front side, a holding arm 12 that holds and fetches the scion seedling W on the conveying mechanism 11 in a separate manner, and a lateral conveying mechanism 13 that supports the holding arm 12 in a movable manner in the lateral direction.

Specifically, the conveying mechanism 11 is configured with a belt conveyer or the like that makes a conveying operation along the lateral direction of the grafting robot main unit 1a, and conveys the scion seedling W to a predetermined position by conveying a cell tray in which a plurality of scion seedlings W grown in a seedling pot until a cotyledon sprouts in a dicotyledonous shape are arranged in a lattice shape by an arrangement pitch.

The holding arm 12 is configured to cut a root side of an embryonic stem of the scion seedling W while holding it on the conveying mechanism 11 in a separate manner, holds the scion seedling W in a state of having a space for accommodating it in a rotatable manner with the embryonic stem in a standing position, and moves back and forth via a back-and-forth moving mechanism 12b to handle the scion seedling W with the conveying mechanism 11 or the relay unit 9.

The lateral conveying mechanism 13 is constituted by a linear slider or the like that can control a lateral position of the holding arm 12 in a range until a position of reaching the front of the relay unit 9 by traversing the conveying mechanism 11. The lateral conveying mechanism 13 makes the holding arm 12 serve as a transversal conveying holding arm that supplies the seedling to the grafting robot main unit 1a.

Figure 3:
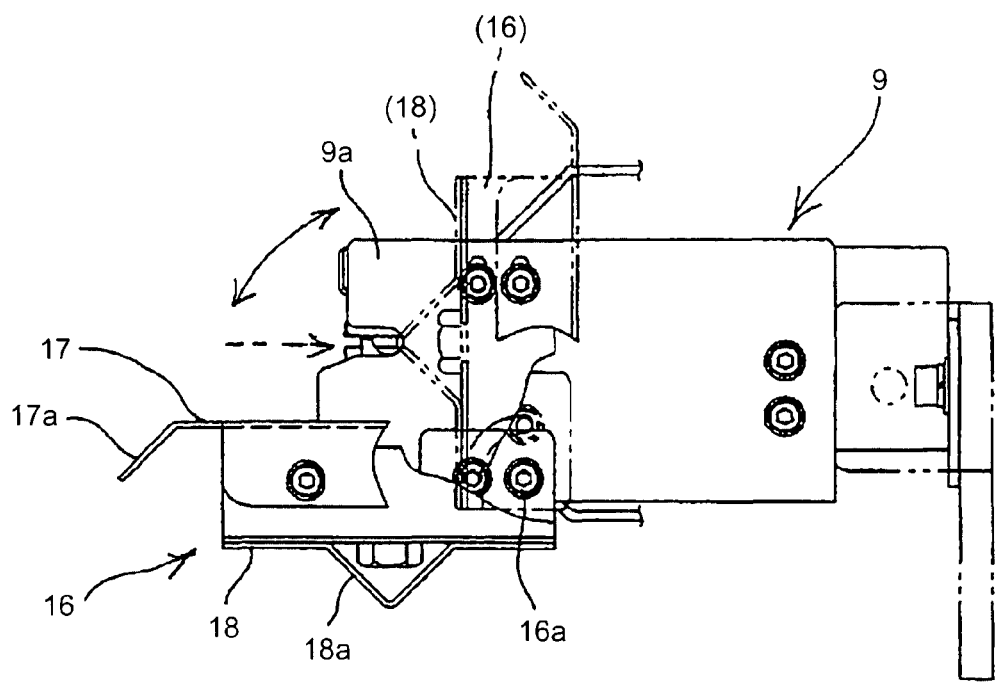
FIG. 3 is an enlarged plan view of relevant parts of a relay unit.

As shown in an enlarged plan view of FIG. 3, the relay unit 9 includes a supply arm 9a that is a switchable holding mechanism that pinches the scion seedling W received from the holding arm 12 in an opening and closing manner and a cotyledon aligning member 16 that aligns a sprouting axial line direction of cotyledons L and L when receiving the scion seedling W from the holding arm 12. The cotyledon aligning member 16 is configured in such a manner that its mounting position can be selected in the relay unit 9, with an aligning unit including a longitudinal direction aligning unit 17 and a lateral direction aligning unit 18 for aligning the sprouting axial line direction of the cotyledons L and L of a seedling received from the holding arm 12 at a predetermined angle.

Specifically, the cotyledon aligning member 16 is configured to be fixed to the relay unit 9 with a first mounting screw 16a at a position selected from two mounting positions having an angle difference of 90 degrees in a planar view, forming the longitudinal direction aligning unit 17 that aligns the sprouting axial line direction of the cotyledons in the longitudinal direction of the relay unit 9 and the lateral direction aligning unit 18 that aligns the sprouting axial line direction of the cotyledons in the lateral direction of the relay unit 9, corresponding to the mounting position of the cotyledon aligning member 16, at back and front positions of the cotyledon aligning member 16.

The longitudinal direction aligning unit 17 is a plate-shaped member elongated in the longitudinal direction of the relay unit 9 from an inclined portion 17a located apart from the cotyledon aligning member 16 toward the front side of the relay unit 9 to a side portion of the relay unit 9, which aligns the sprouting axial line direction of the cotyledons L and L in the longitudinal direction of the relay unit 9 by bringing side edges of the cotyledons L and L into contact with the longitudinal direction aligning unit 17 using the inclined portion 17a as a guide when the relay unit 9 receives the scion seedling from the holding arm 12 in the front. The longitudinal direction aligning unit 17 can support scion seedlings having different cotyledon sizes by adjusting a distance from an embryonic stem A.

The lateral direction aligning unit 18 is a plate-shaped member extending in the lateral direction of the relay unit 9, being configured with a lateral inclined portion 18a with a center portion projected, which aligns the sprouting axial line direction of the cotyledons L and L in the lateral direction of the relay unit 9 by bringing front edges of the cotyledons L and L into contact with the lateral direction aligning unit 18 using the lateral inclined portion 18a as a guide when the relay unit 9 receives the scion seedling from the holding arm 12 in the front.

Figure 4A:
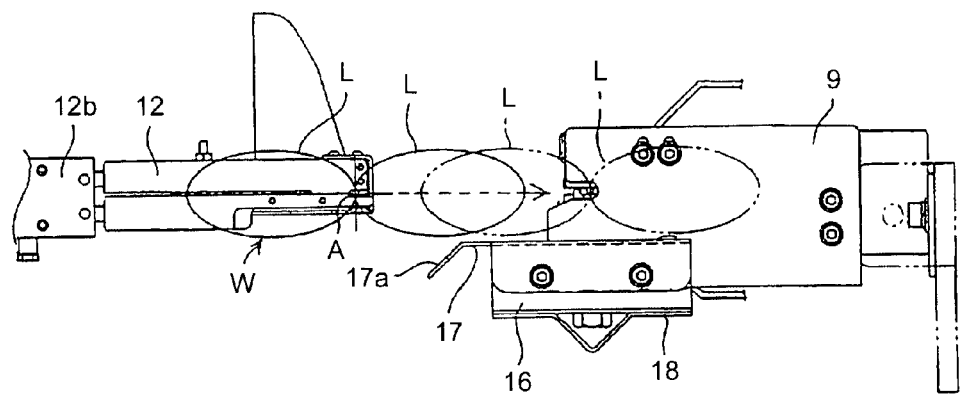
FIG. 4A is a schematic diagram for explaining an alignment operation in a longitudinal direction.

When aligning the sprouting axial line direction in the longitudinal direction of the relay unit 9, as shown in a schematic diagram of FIG. 4A, the cotyledon aligning member 16 having the above configuration is mounted longitudinally on a side position of the relay unit 9 to use the longitudinal direction aligning unit 17, so that it is possible to align the sprouting axial line direction in the front direction of the relay unit 9 by bringing the side edge of the cotyledon L into contact with the longitudinal direction aligning unit 17 using the inclined portion 17a as a guide when the relay unit 9 receives the scion seedling from the holding arm 12 in the front.

The longitudinal direction aligning unit 17 is applied to a grafting process in which a relation between sprouting axial lines of the scion and the stock shows an angle difference of 90 degrees, which means that, for a seedling having a cross-sectional shape of its embryonic stem close to a rectangular shape or a circular shape, such as a cucumber seedling and a melon seedling, it is possible to produce a grafted seedling with which each of the cotyledons can be exposed to the sunlight by setting the cotyledon sprouting axial line directions with an angle difference of 90 degrees.

Figure 4B:
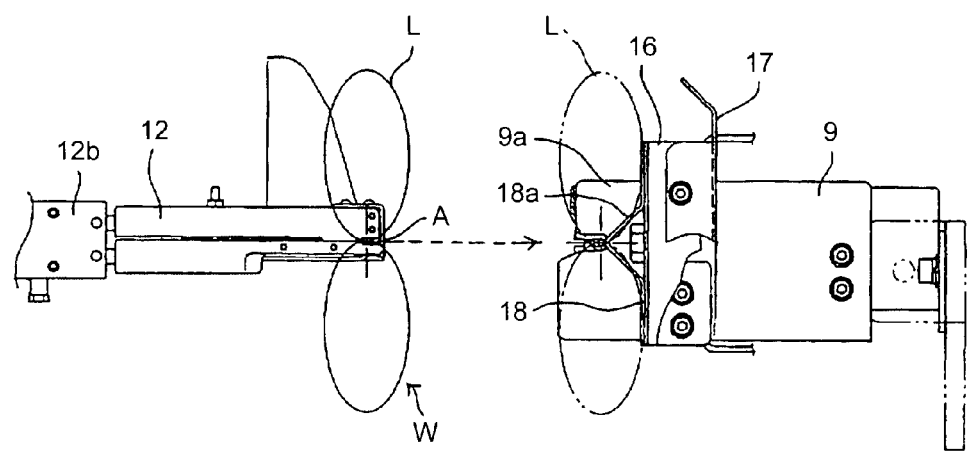
FIG. 4B is a schematic diagram for explaining an alignment operation in a lateral direction.

When aligning the sprouting axial line direction in the lateral direction of the relay unit 9, as shown in a schematic diagram of FIG. 4B, the cotyledon aligning member 16 is mounted at a transversal position of the relay unit 9 to use the lateral direction aligning unit 18, so that it is possible to align the sprouting axial line direction in the lateral direction of the relay unit 9 by bringing the front edges of the cotyledons L and L into contact with the lateral direction aligning unit 18 using the lateral inclined portion 18a as a guide when the relay unit 9 receives the scion seedling from the holding arm 12 in the front.

The lateral direction aligning unit 18 is applied to a grafting process in which the sprouting axial lines of the scion and the stock match each other, which means that, for a seedling having a cross-sectional shape of its embryonic stem close to an elliptical shape, such as a watermelon seedling, it is possible to produce a grafted seedling with which a joining area of the scion and the stock can be maximized by matching the cotyledon sprouting axial line directions.

In this manner, either one of the two aligning units, the longitudinal direction aligning unit 17 and the lateral direction aligning unit 18, is selected by switching the mounting position of the cotyledon aligning member 16, so that the cotyledon sprouting axial line direction of the scion or the stock can be switched. Therefore, with the grafted seedling producing device 1, it is possible to effectively perform the grafting process in a general manner by switching the sprouting axial line direction to be aligned for various seedlings having a cotyledon that sprouts in a dicotyledonous shape by a simple configuration using a cotyledon aligning member of which the mounting position can be selected.

Figure 5:
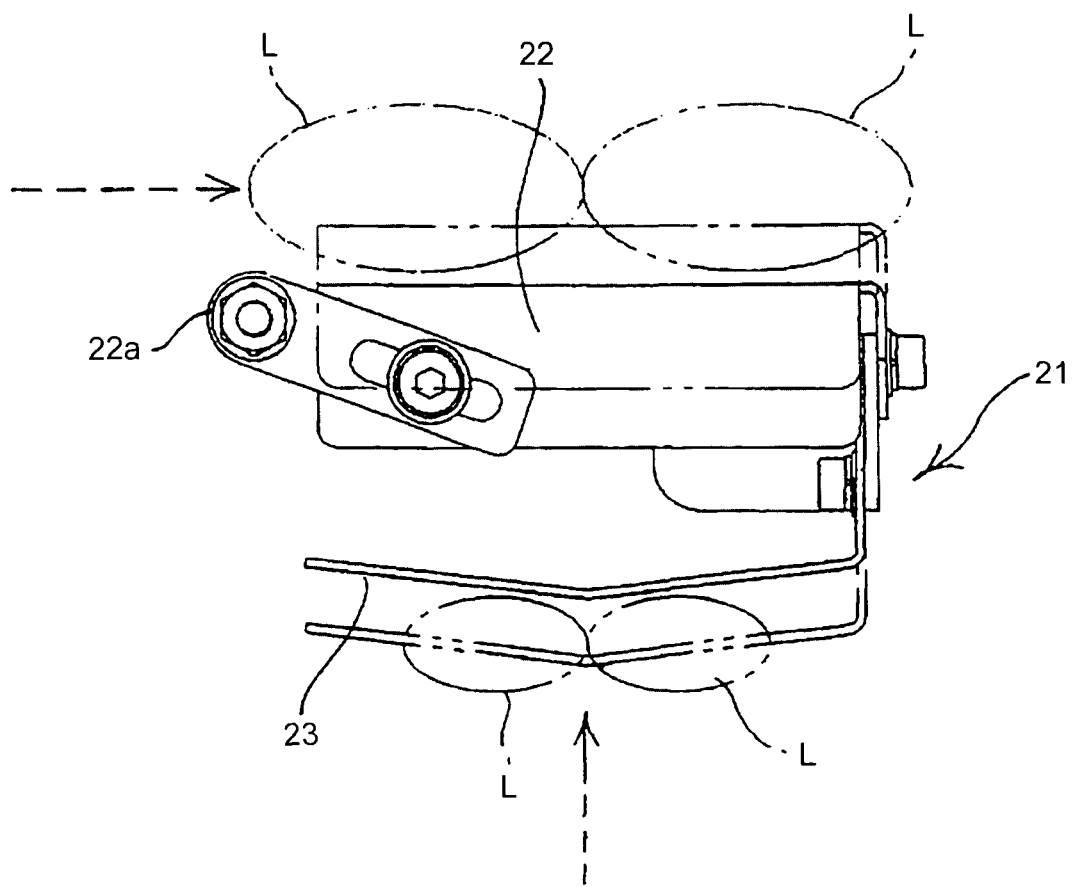
FIG. 5 is an enlarged plan view of another aligning member.

As another configuration example of the cotyledon aligning member, as shown in an enlarged plan view of FIG. 5, a cotyledon aligning member 21 of another example is configured to be fixed to the relay unit 9 with a second mounting screw (not shown) at a position selected from two mounting positions having an angle difference of 90 degrees in a planar view, forming a longitudinal direction aligning unit 22 of the another example that aligns the sprouting axial line directions of the cotyledons in the longitudinal direction of the relay unit 9 and a lateral direction aligning unit 23 of the another example that aligns the sprouting axial line directions of the cotyledons in the lateral direction of the relay unit 9, corresponding to the mounting position of the cotyledon aligning member 21, at back and front positions of the cotyledon aligning member 21.

The longitudinal direction aligning unit 22 of the another example is a plate-shaped member elongated along a side portion of the relay unit 9 with a second roller 22a located apart from the cotyledon aligning member 21 toward the front side of the relay unit 9, which aligns the cotyledon sprouting axial line direction in the longitudinal direction of the relay unit 9 by bringing a side edge of the cotyledon L into contact with the longitudinal direction aligning unit 22 using the second roller 22a as a guide when the relay unit 9 receives the scion seedling from the holding arm 12 in the front. The longitudinal direction aligning unit 22 can support scion seedlings having different cotyledon sizes by adjusting a contact position of the cotyledon.

The lateral direction aligning unit 23 of the another example a plate-shaped member extending in the lateral direction of the relay unit 9 with a center portion projected, which aligns the sprouting axial line directions of the cotyledons L and L in the lateral direction of the relay unit 9 by bringing front edges of the cotyledons L and L into contact with the lateral direction aligning unit 23 using a lateral inclined portion as a guide when the relay unit 9 receives the scion seedling from the holding arm 12 in the front. The lateral direction aligning unit 23 can support scion seedlings having different cotyledon sizes by adjusting a contact position of the cotyledon.

Figure 6A:
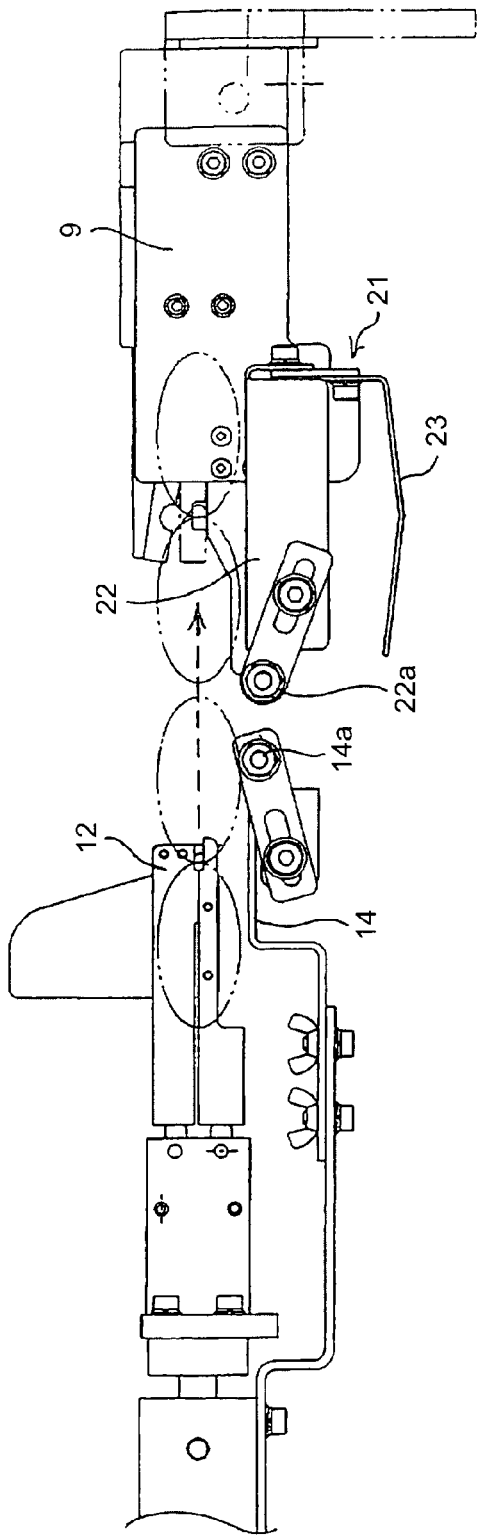
FIG. 6A is a schematic diagram for explaining another alignment operation in the longitudinal direction.

In the same manner as the cotyledon aligning member 16, when aligning the cotyledon sprouting axial line direction in the front direction of the relay unit 9, as shown in a schematic diagram of FIG. 6A, the cotyledon aligning member 21 of the another example is mounted longitudinally on a side position of the relay unit 9 to use the longitudinal direction aligning unit 22 of the another example, and a longitudinal aligning member 14, which will be described later, formed with a plate-shaped member elongated in the longitudinal direction along the holding arm 12 is fixed to be used as a stopper in the longitudinal direction. A first roller 14a is provided on a distal end position of the longitudinal aligning member 14 to guide the cotyledon.

When the relay unit 9 receives the scion seedling from the holding arm 12 in the front by moving forward the holding arm 12, the sprouting axial line directions of the cotyledons L and L are guided in the longitudinal direction by the longitudinal aligning member 14 that is fixed at a side position of the holding arm 12 as a stopper, and by bringing side edges of the cotyledons L and L into contact with the longitudinal direction aligning unit 22 of the another example using the second roller 22a of the relay unit 9 as a guide, it is possible to align the sprouting axial line direction in the front direction of the relay unit 9.

Figure 6B:
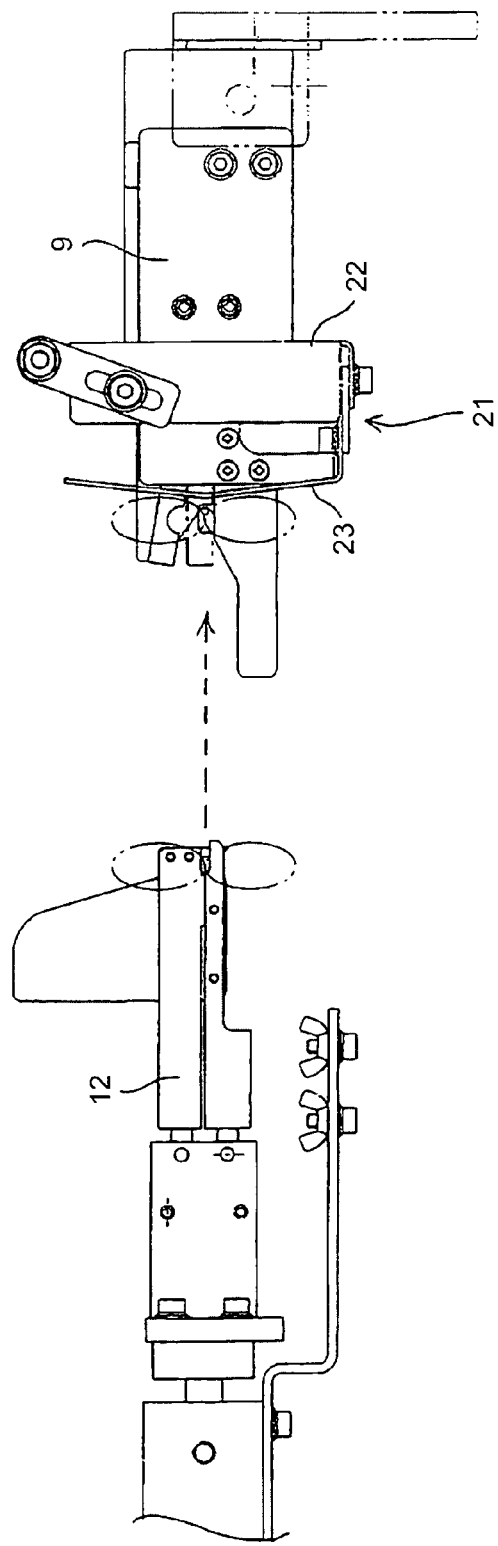
FIG. 6B is a schematic diagram for explaining another alignment operation in the lateral direction.

Meanwhile, when aligning the cotyledon sprouting axial line direction in the lateral direction of the relay unit 9, as shown in a schematic diagram of FIG. 6B, the cotyledon aligning member 21 is mounted at a transversal position of the relay unit 9 to use the lateral direction aligning unit 23 of the another example, so that it is possible to align the sprouting axial line direction in the lateral direction of the relay unit 9 by bringing the front edges of the cotyledons L and L into contact with the lateral direction aligning unit 23 using the lateral inclined portion as a guide when the relay unit 9 receives the scion seedling from the holding arm 12 in the front.

In this manner, either one of the two aligning units, the longitudinal direction aligning unit 22 of the another example and the lateral direction aligning unit 23 of the another example, is selected by switching the mounting position of the cotyledon aligning member 21 of the another example, in the same manner as the cotyledon aligning member 16, so that the cotyledon sprouting axial line direction of the scion or the stock can be switched. Therefore, with the grafted seedling producing device 1, it is possible to effectively perform the grafting process in a general manner by switching the sprouting axial line direction to be aligned for various seedlings having a cotyledon that sprouts in a dicotyledonous shape by a simple configuration using a cotyledon aligning member of which the mounting position can be selected.

(Intermediate Aligning Unit)

In a stage prior to a delivery of the seedling in the relay unit 9, an intermediate aligning unit is installed to perform pre-processing to align the cotyledon in the longitudinal direction prior to the alignment of the cotyledon in the relay unit 9.

Figure 7:
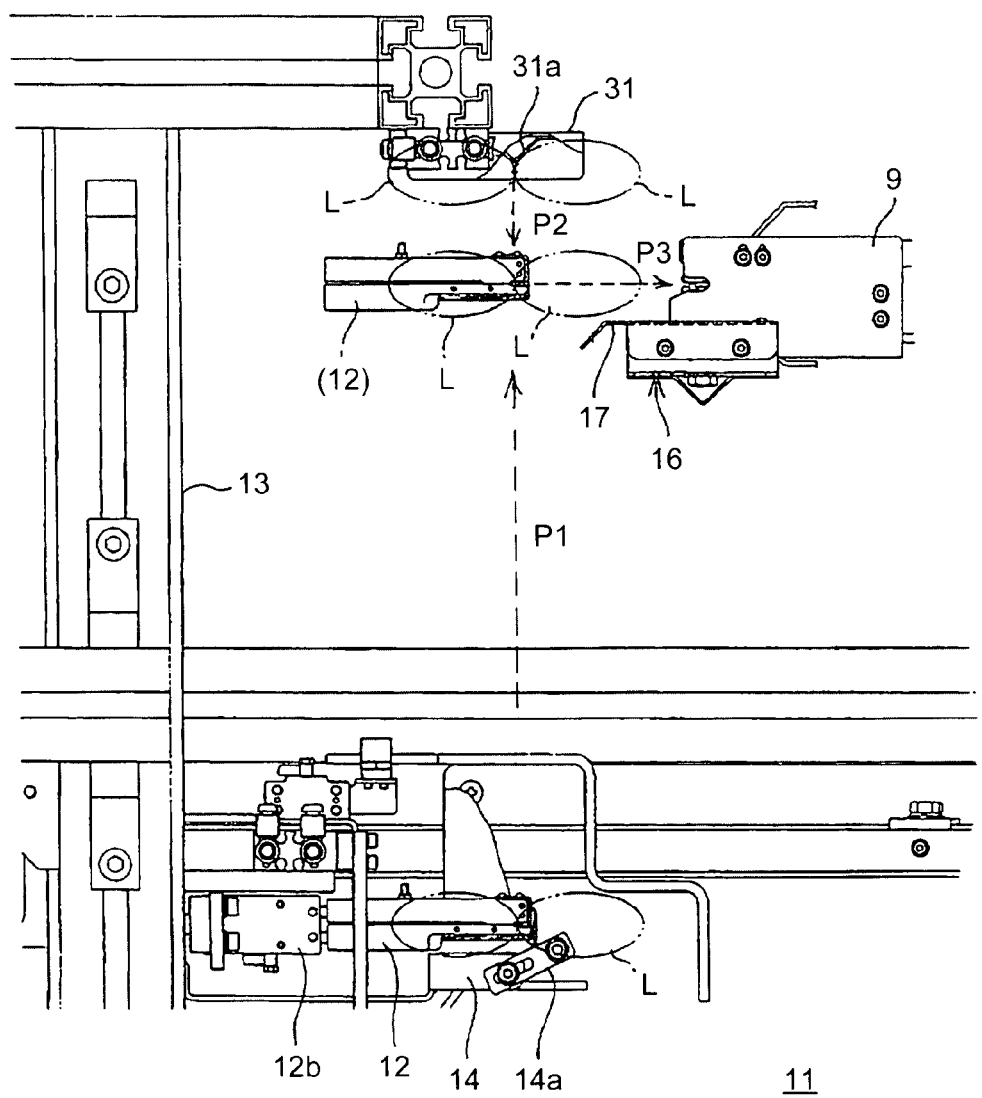
FIG. 7 is a plan view of a process of pre-processing.

In the process of the pre-processing, as shown in a plan view of FIG. 7, an intermediate aligning unit 31 is provided at a lateral conveying end position of the holding arm 12. The intermediate aligning unit 31 is a plate-shaped member elongated in a lateral direction viewed from the lateral conveying direction of the holding arm 12 with an intermediate inclined portion 31a with a center portion projected, which is formed in the same manner as the lateral direction aligning unit 18, and aligns the sprouting axial line directions of the cotyledons L and L in the lateral direction of the intermediate aligning unit 31, that is, in the longitudinal direction of the relay unit 9, by bringing front edges of the cotyledons L and L into contact with the intermediate aligning unit 31 using the intermediate inclined portion 31a as a guide when the intermediate aligning unit 31 receives the scion seedling from the holding arm 12 in the front.

The cotyledon aligning method for the scion seedling W using the intermediate aligning unit 31 includes fixing the longitudinal direction aligning unit 22 for preliminary alignment that aligns the cotyledons L and L in the longitudinal direction at the side position of the holding arm 12, performing a lateral movement P1 to the intermediate aligning unit 31 at the lateral conveying end position at the maximum speed by the lateral conveying mechanism 13 while the holding arm 12 separately holds the scion seedling W on the conveying mechanism 11 after mounting the cotyledon aligning member 16 on the relay unit 9 such that the longitudinal direction aligning unit 17 is to be used, performing a lateral movement P2 to return to the front position of the relay unit 9, and performing a longitudinal movement P3 for moving the holding arm 12 to the relay unit 9 by the back-and-forth moving mechanism 12b.

In this series of processes, because the cotyledons L and L of the scion seedling are aligned in the longitudinal direction of the relay unit 9 by the intermediate aligning unit 31, it is possible to perform the longitudinal direction alignment in the relay unit 9 in a smooth manner. The lateral conveying mechanism 13 is configured to control the movement speed to low right before the intermediate aligning unit 31, and the intermediate aligning unit 31 is configured to be hoistable down to a standby position when it is not used.

(Swing Alignment)

Figure 8:
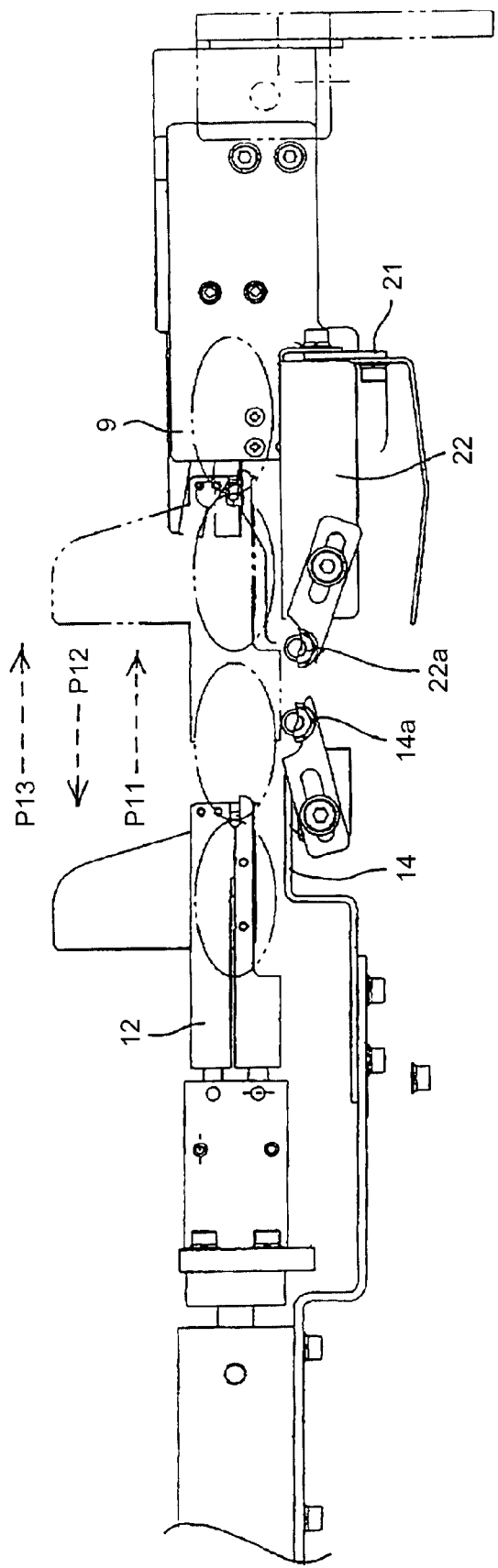
FIG. 8 is a schematic diagram for explaining an operation in the relay unit.

When aligning the cotyledon in the longitudinal direction in the relay unit 9, as shown in a schematic diagram of FIG. 8, the longitudinal aligning member 14 and the longitudinal direction aligning unit 22 of the another example are arranged as two guide plates to align the cotyledons L and L in the longitudinal direction in the relay unit 9, and a swing conveying operation of the holding arm 12 is performed in a state in which the first roller 14a and the second roller 22a come close to each other, that is, the scion seedling in the holding arm 12 is delivered to the relay unit 9 by performing a forward movement P11 and a backward movement P12 and then a forward movement P13 of the holding arm 12 again.

In a conventional alignment of a cucumber seedling, an alignment is performed by conveying a seedling by the lateral conveying mechanism 13 to an alignment plate installed at a conveying direction end point passing a position of the relay unit 9 after fetching the seedling, so that a conveying distance is long because the seedling is to be returned to the position of the relay unit 9, causing a startup loss time due to an increase of the number of conveyances, the processing speed is slow, and different programs are required for a watermelon and a cucumber having different alignment directions. However, with the above swing alignment, it is possible to cut down the cost from enhancement of the processing speed, generalization of the program, and reduction of the lateral conveyance strokes.

(Preliminary Alignment)

Figure 9:
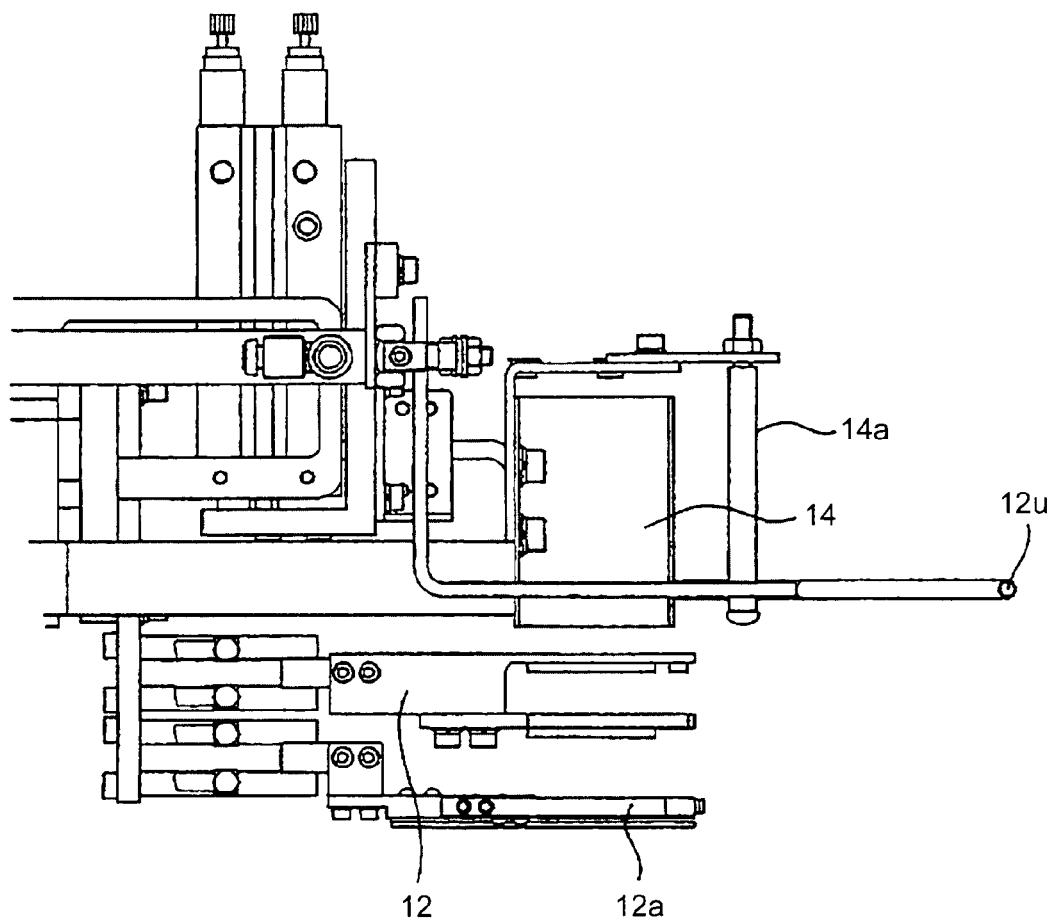
FIG. 9 is a side view of a holding arm.
Figure 10A:
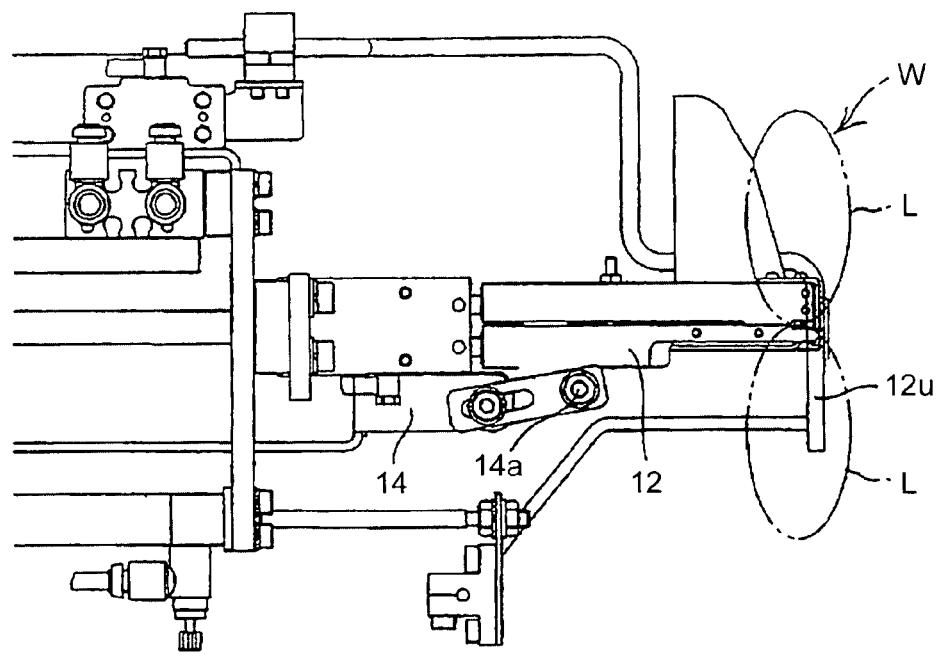
FIG. 10A is a schematic diagram for explaining a fetching operation at the time of start.
Figure 10B:
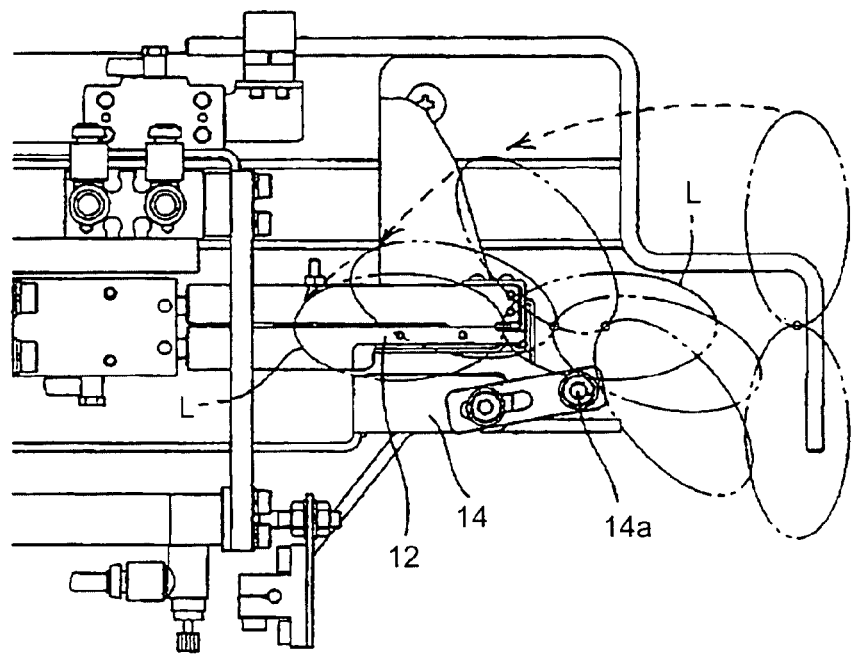
FIG. 10B is a schematic diagram for explaining a fetching operation at the time of end.

When performing a preliminary alignment of the cotyledon at the time of fetching the seedling, as shown in a side view of FIG. 9, a seedling is fetched by the holding arm 12 from a seedling raising tray by setting a pullout lever 12u, and a control of direction and height of a leaf is performed by the longitudinal aligning member 14 and the first roller 14a mounted at a higher position on the side of the holding arm 12. The start state and the end state of the fetching operation are shown in FIGS. 10A and 10B, respectively. The longitudinal aligning member 14 serves as a stopper for positioning rotating cotyledons L and L at stop positions, and the preliminary alignment of the cotyledons L and L of the scion seedling W is performed by arranging the first roller 14a at a position where the cotyledon L bumps when the seedling is pulled back by the holding arm 12 at the front position.

Conventionally, an alignment of a scion of a cucumber or a melon is performed by using a method by a contact with a linear actuator of the lateral conveying mechanism 13, in which there is no swinging process for the stock and the contact, and the contact is made at a low speed. However, with the above longitudinal aligning member 14, it is possible to perform a certain level of preliminary alignment to set a direction of the cotyledon.

(Delivery Control of Relay Unit)

In a delivery operation in the relay unit 9, in order to maintain the alignment direction of the seedling, as shown in FIGS. 11A and 11B, the supply arm 9a in which a semicircular gap or a circular gap formed by left and right semicircles is formed to hold the seedling in a state of having a space for the embryonic stem to move to adjust a holding height of the seedling and an auxiliary arm 9b that holds the embryonic stem A under the supply arm 9a in a contacting manner are provided, and including the holding arm 12 and a cutting arm 12a under the holding arm 12, the operation is controlled by a first process to a fifth process, as shown in a process chart of a delivery operation in FIG. 12.

Figure 13A:
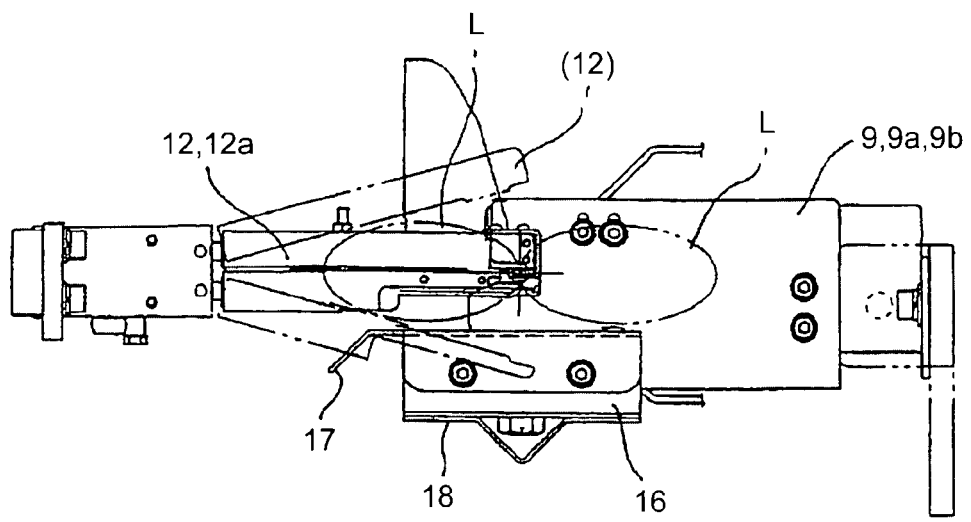
FIG. 13A is a plan view of a second process of the delivery operation.
Figure 13B:
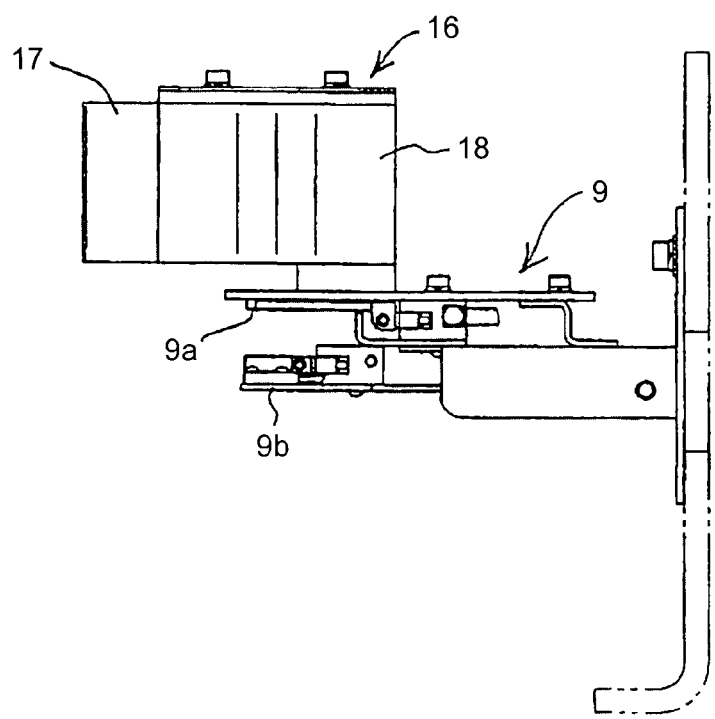
FIG. 13B is a side view of the second process of the delivery operation.
Figure 14A:
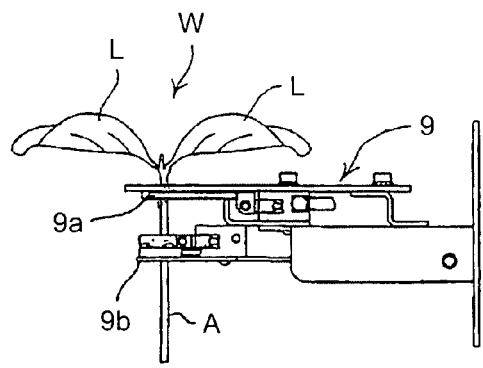
FIG. 14A is a side view of a third process of the delivery operation.
Figure 14B:
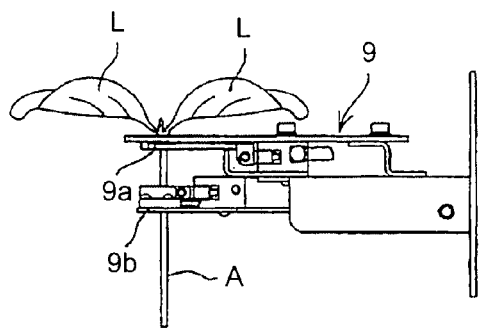
FIG. 14B is a side view of a fourth process of the delivery operation.

That is, the scion seedling W held by the holding arm 12 and the cutting arm 12a (the first process) is held by the supply arm 9a and the auxiliary arm 9b of the relay unit 9 (the second process) at the time of delivery, as shown in a plan view and a side view of FIGS. 13A and 13B, respectively. The seedling is delivered by opening the holding arm 12 and the cutting arm 12a (the third process), as shown in FIG. 14A, the height of the seedling is positioned by performing opening and closing of the auxiliary arm 9b once (the fourth process), as shown in FIG. 14B, and the operation is controlled to stand by for the next process by holding the seedling with the supply arm 9a and the auxiliary arm 9b again (the fifth process).

Conventionally, when delivering the seedling from the holding arm 12 to the supply arm 9a, the auxiliary arm 9b is opened, and then opening of the holding arm 12 and closing of the auxiliary arm 9b are synchronized with each other. At this time, the scion seedling is in a free state in a broad slit of the supply arm 9a at the time of delivering the seedling, so that if the cotyledon is stuck to the holding arm 12, a direction of the aligned cotyledon is changed. However, with a control of the above operation procedures, it is possible to improve the precision of aligning the direction of the cotyledon.

Furthermore, the scion seedling does not require a severe positioning of the height as the stock seedling, and in actual cases, a positioning process is applied to the stock seedling in which both upper and lower arms are brought into contact with the seedling and the lower arm is pulled down by a cylinder. However, this positioning process cannot be applied to the scion seedling because the scion seedling is narrower and weaker than the stock seedling, so that the positioning of the height of the scion seedling can be performed by the above method.

(Alignment Control for Overgrown Seedling)

Figure 15A:
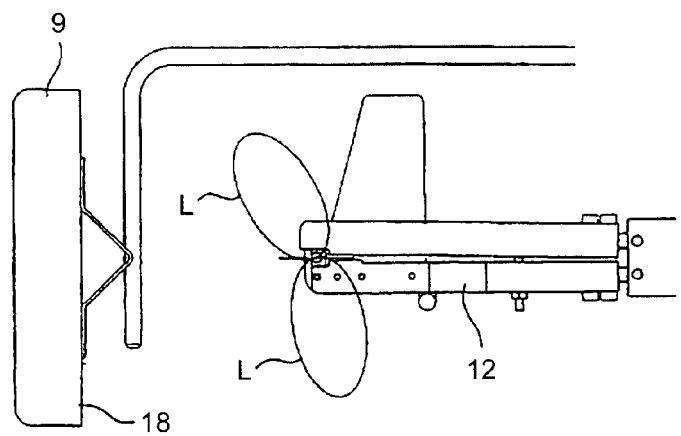
FIGS. 15A and 15B are plan views of a back-and-forth moving operation.
Figure 15B:
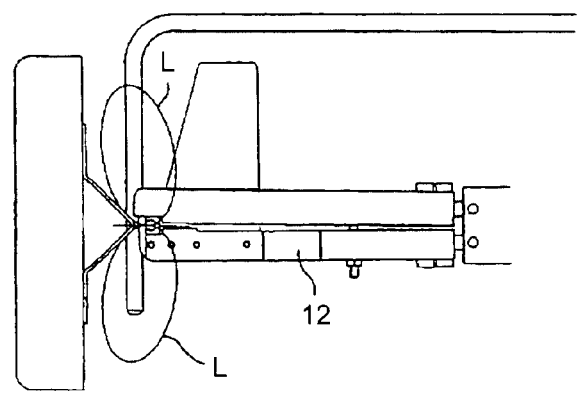
Figure 16:
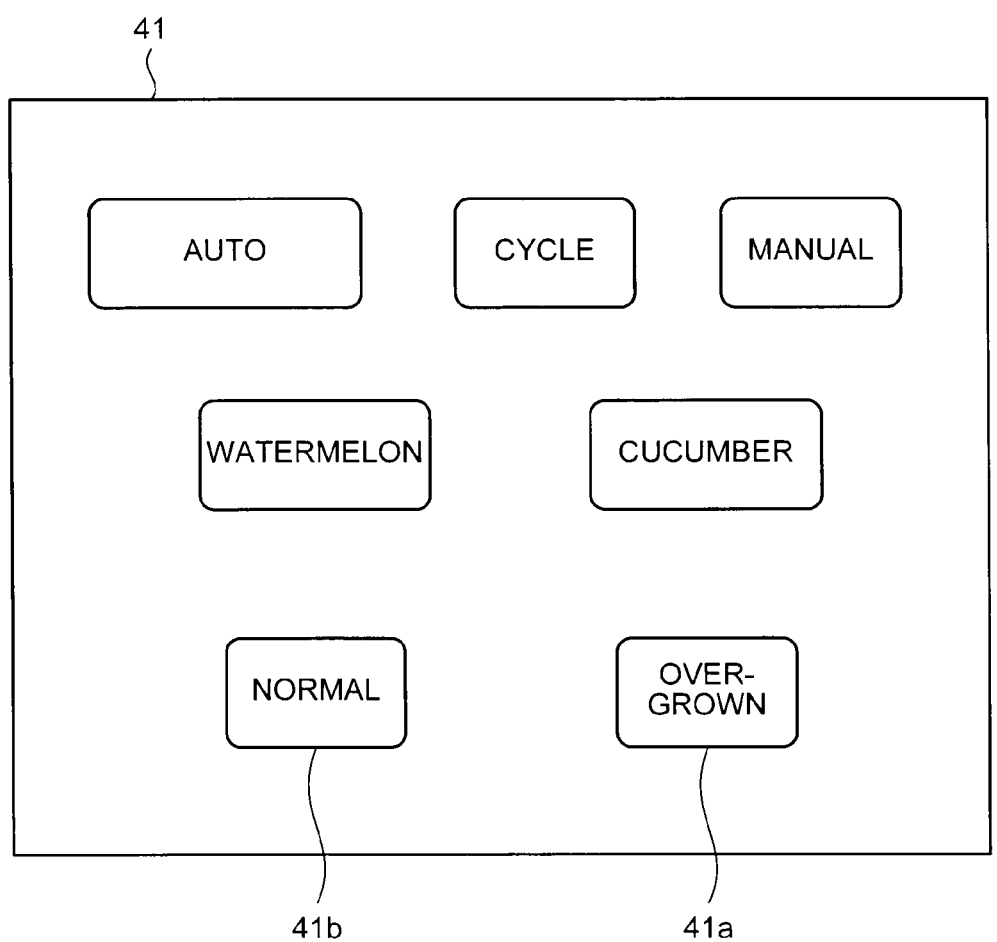
FIG. 16 is an overview of an operation panel.
Figure 17:
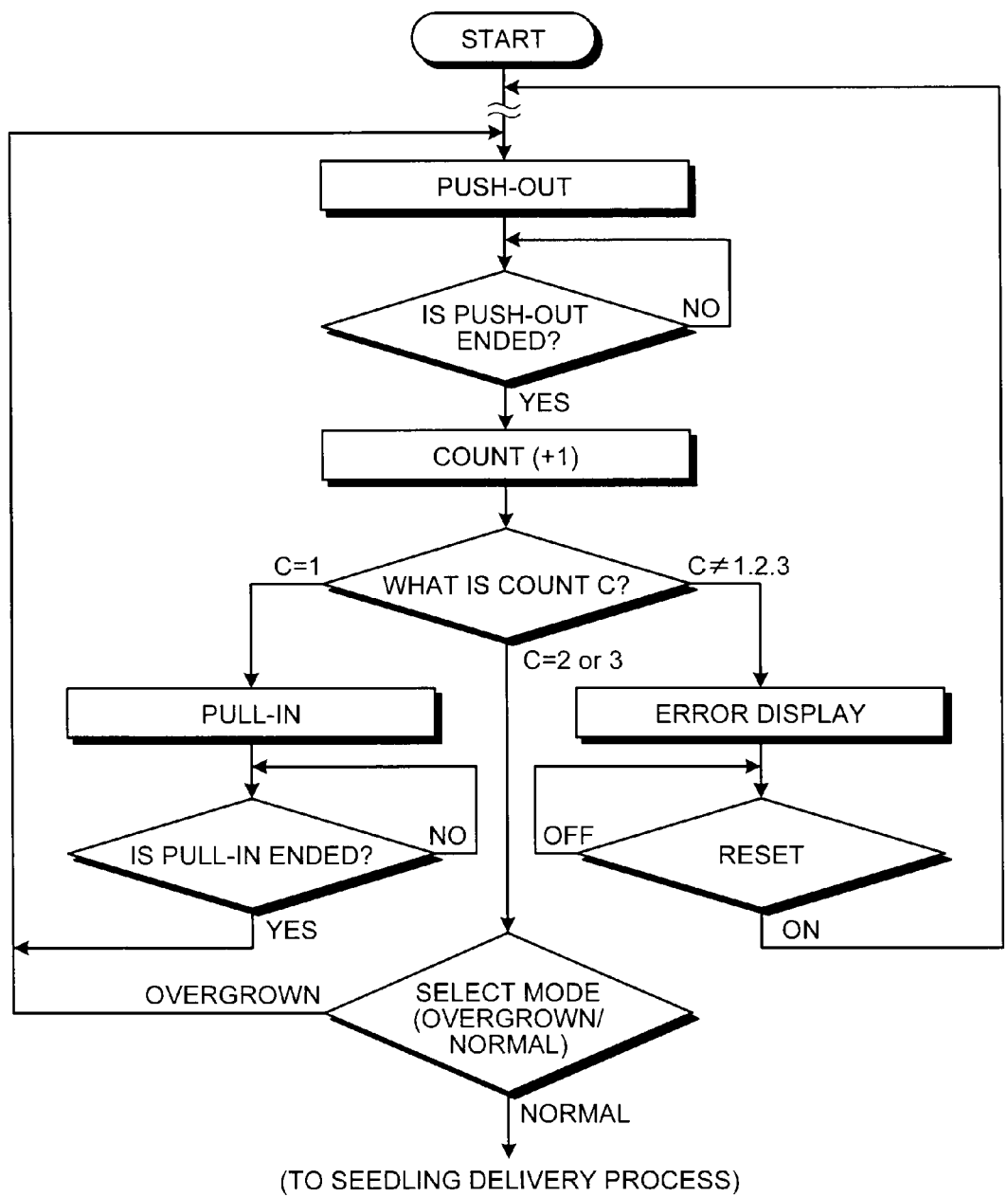
FIG. 17 is a flowchart of a back-and-forth movement control process.

When handling an overgrown seedling or a seedling that is largely bent, in order to align the direction of the cotyledon for sure, a back-and-forth moving operation of the holding arm 12 shown in FIGS. 15A and 15B is performed more than usual, for example, three times if the usual case is two times. A switching between the overgrown case and the normal case is performed by a mode select with a "normal" switch 41a and an "overgrown" switch 41b on an operation panel 41 shown in an overview thereof in FIG. 16 (it is configured that, if the mode is not selected when pressing a start switch, an input from the start switch is ignored), and before delivering the seedling from the holding arm 12, the back-and-forth moving operation of the holding arm 12 is performed two times in the normal mode and three times in the overgrown mode, for example, according to the selected mode by a back-and-forth movement control process shown in a flowchart of FIG. 17.

Conventionally, swinging is performed by two times of back-and-forth moving operation regardless of a length of the embryonic stem, so that an overgrown seedling is not fully settled at the time of delivery, resulting in a supply failure.

However, with the above mode select, it is possible to prevent the supply failure and to improve seedling adaptability and precision of height reference. Although the setting is made in such a manner that the overgrown mode is used when the length of the seedling (the length of the embryonic stem) in a cell is 65 millimeters or longer, even if the overgrown mode is used for a seedling shorter than 65 millimeters, there occurs no supply failure, merely causing a slightly slower processing speed.

(Pre-Alignment of the Lateral Direction Alignment)

Figure 18:
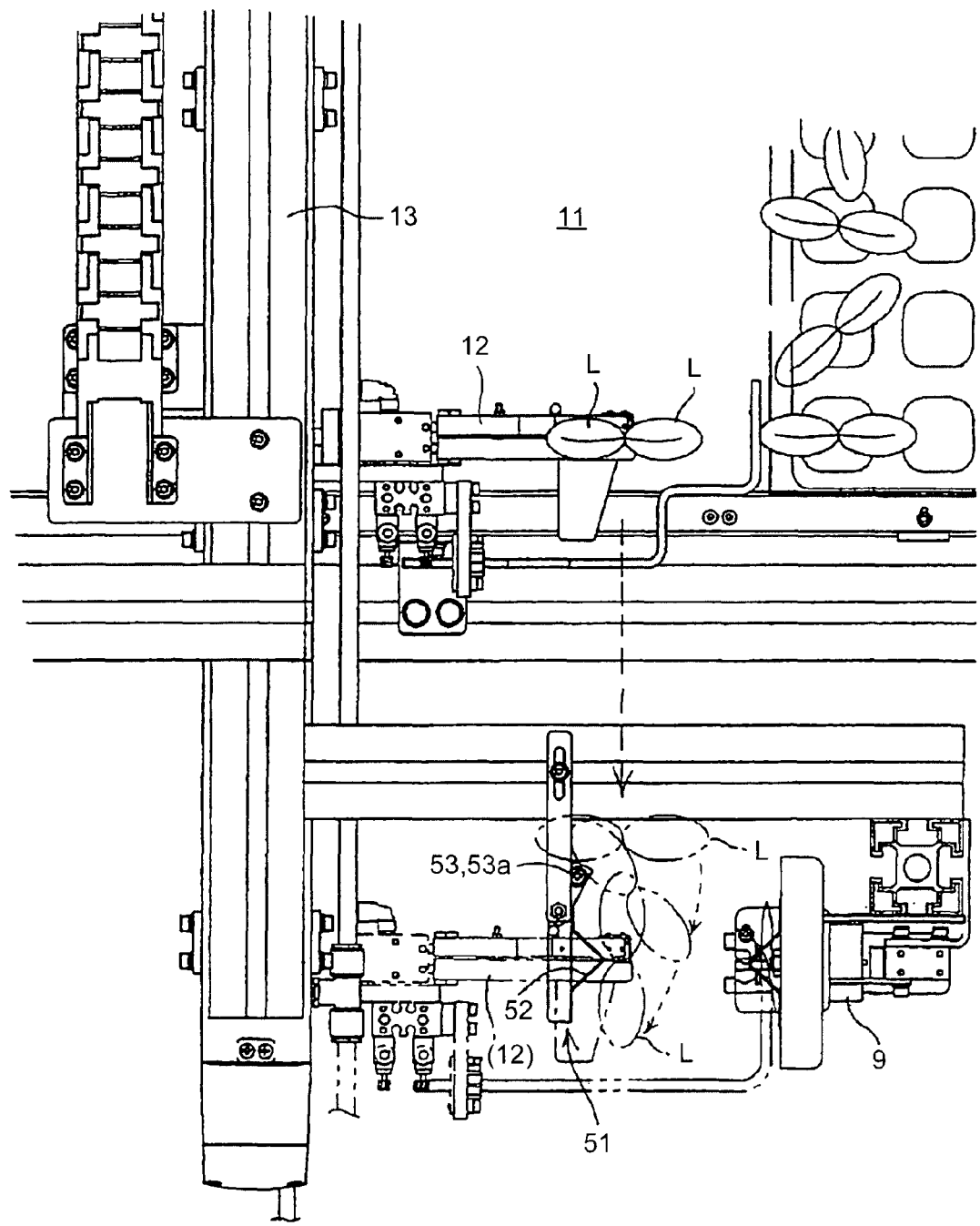
FIG. 18 is a plan view of relevant parts in a lateral conveying process.
Figure 19:
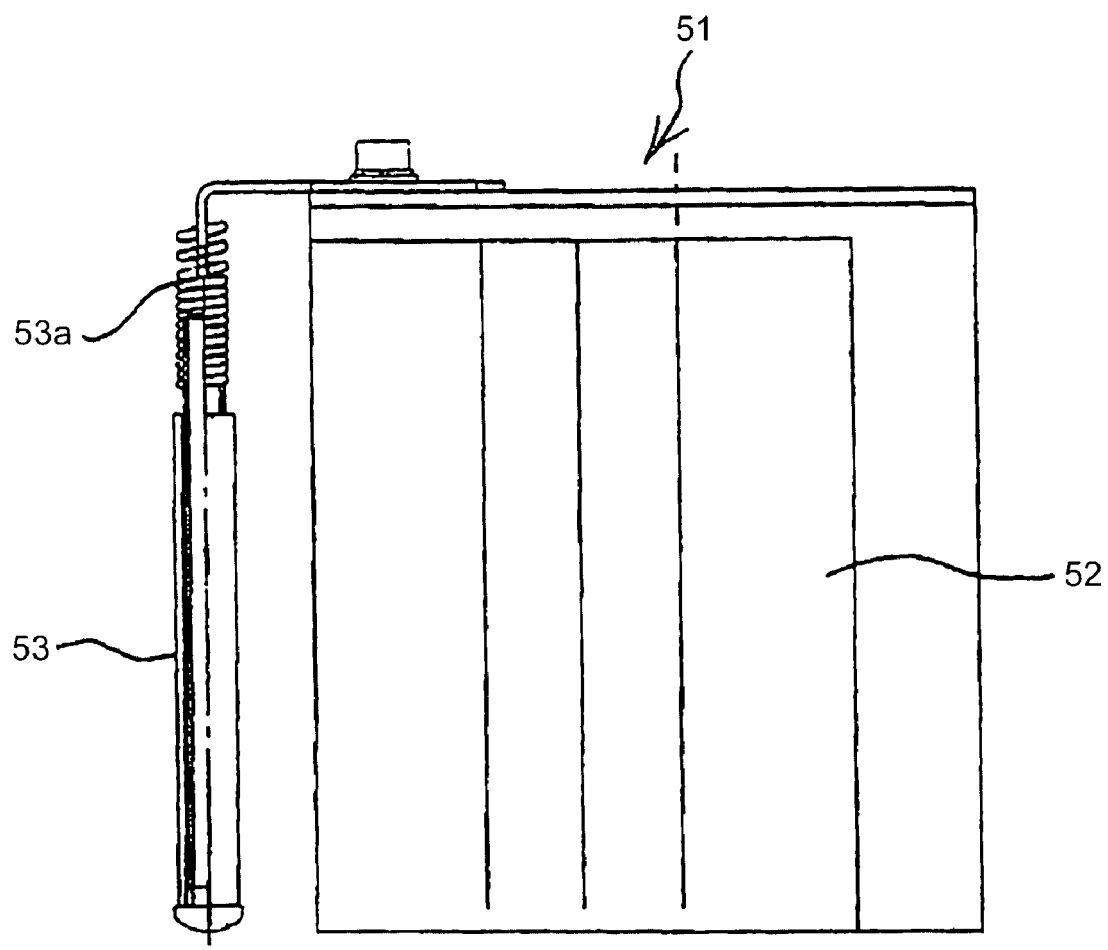
FIG. 19 is an enlarged front view of a pre-alignment unit.
Figure 20A:
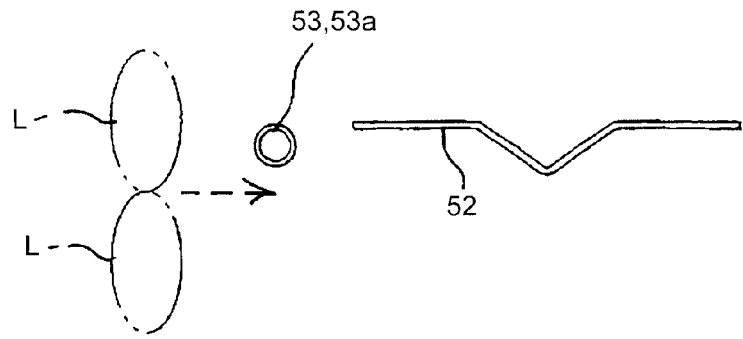
FIGS. 20A to 20D are schematic diagrams for explaining an operation of the pre-alignment unit.
Figure 20B:
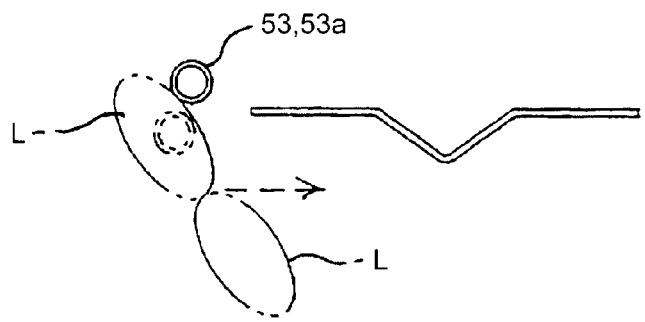
Figure 20C:
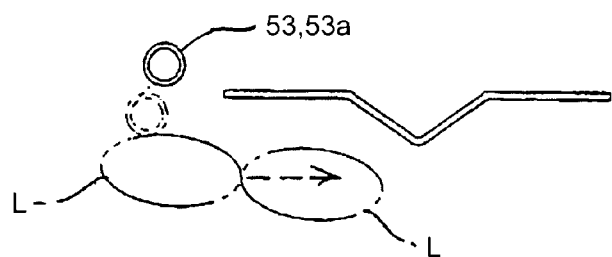
Figure 20D:
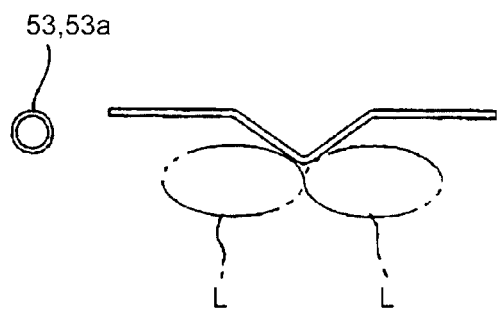

In a pre-alignment of the seedling when aligning it in the lateral direction, as shown in a plan view of relevant parts of FIG. 18, a pre-aligning unit 51 that aligns the cotyledons L and L in the lateral direction along the conveying direction of the lateral conveying mechanism 13 is provided. As shown in an enlarged front view of FIG. 19, the pre-aligning unit 51 includes a pre-aligning plate 52 for aligning the seedling in advance and a reverse roller 53. A supporting point 53a of the reverse roller 53 is configured with a spring for changing a bump strength (contacting strength) depending on a stiffness of the seedling.

When a position of the cotyledon of the seedling is different from the aligning direction, as shown in schematic diagrams of FIGS. 20A to 20D, with the pre-aligning unit 51 having the above configuration, if the cotyledon L of the seedling is brought into contact with the reverse roller 53 that takes a role of a guide for rotating the seedling while the seedling is being conveyed, the seedling is reversed. Because the reverse roller 53 swings in an obliquely backward direction, the point of application of reversing force is far from the supporting point, so that a damage to the seedling is reduced.

Particularly, for a seedling that is directed with an angle difference of 90 degrees or a seedling of which the cotyledon L is directed to the reverse roller 53, if a conventional fixed roller is used, a force caused by the conveyance is directly applied to the supporting point, which causes a damage to the seedling. However, with the pre-aligning unit 51 having the above configuration, it is possible to avoid such damage to the seedling. Furthermore, by providing a stopper behind the roller, it is also possible to make the roller function as a fixed roller for a seedling having a size larger than a predetermined size (swing).

(Relay Unit Alignment Plate)

Figure 21A:
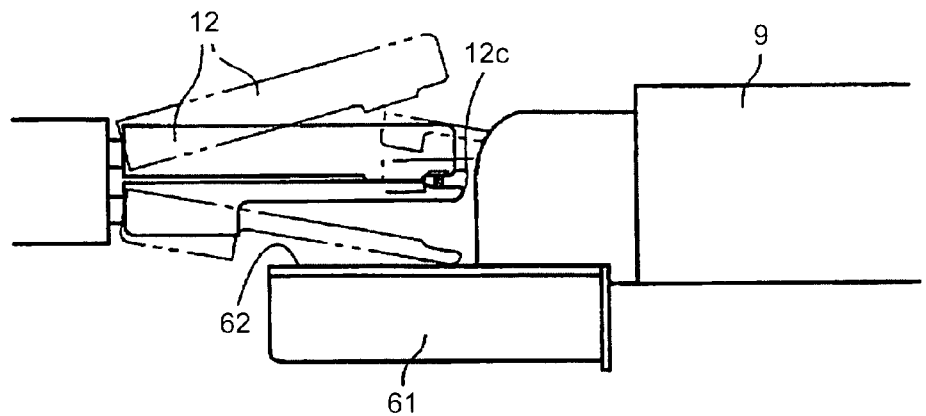
FIG. 21A is a plan view of the relay unit.
Figure 21B:
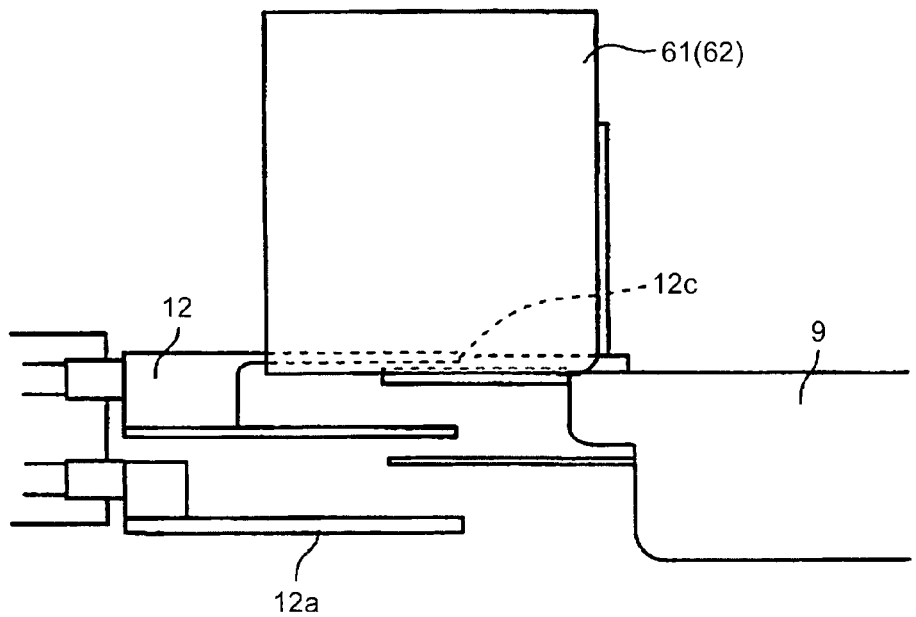
FIG. 21B is a side view of the relay unit.

In the relay unit 9, as shown in a plan view and a side view of FIGS. 21A and 21B, respectively, a relay aligning plate 61 that aligns the cotyledon in the longitudinal direction is provided until a height position of the holding arm 12 in which a synthetic resin rubber 62 is patched on a surface that serves as a guide for the cotyledon. Furthermore, a distal end portion 12c of the holding arm 12 that conveys the seedling, which faces the relay aligning plate 61 is R-shaped, and the synthetic resin rubber 62 is arranged at the height position of the holding arm 12 such that the holding arm 12 is stopped during its opening operation.

Because the relay alignment plate 61 having the above configuration does not require a clearance that serves as a space for opening and closing operation at a side of the holding arm 12 according to a conventional configuration, it is possible to improve the precision of aligning the cotyledon by preventing an alignment failure caused by the cotyledon entering into the clearance or a damage to the cotyledon caused when the holding arm performs an operation in the longitudinal direction.

To explain details of the present invention in the grafted seedling processing apparatus described above, a newly constituted embodiment is explained below with new reference numerals denoted to respective constituent members.

Figure 22A:
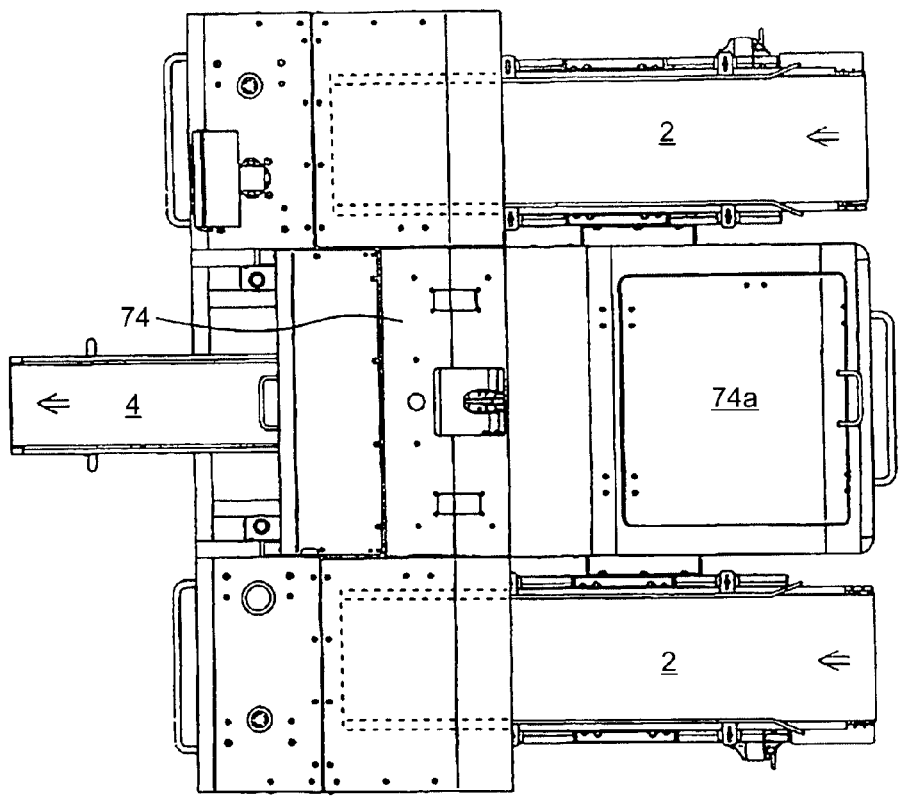
FIG. 22A is a plan view of a grafted seedling processing apparatus depicting its overall configuration.
Figure 22B:
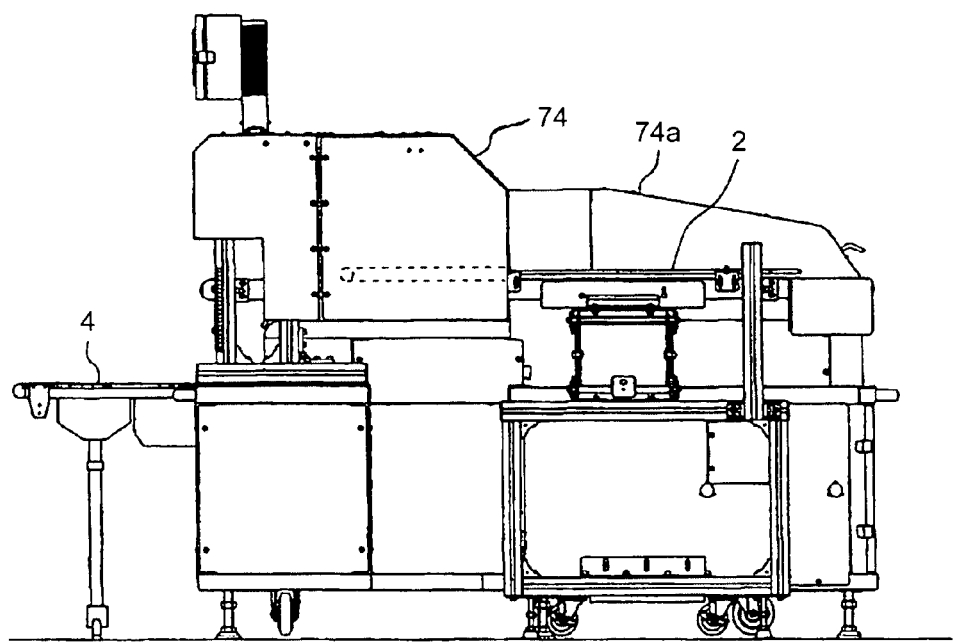
FIG. 22B is a side view of the grafted seedling processing apparatus depicting its overall configuration.

As shown in a plan view and a side view of FIGS. 22A and 22B, respectively, the grafted seedling processing apparatus includes a grafting processing unit 74 employing a grafting robot that is arranged at the center to perform a joining of a stock seedling and a scion seedling in an automatic manner, left and right loading units 2 and 2 employing conveyors for conveying cell trays of the stock seedling and the scion seedling at left and right sides, respectively, a clip supply unit 74a that supplies a clip for fixing the joined stock seedling and scion seedling from behind the grafting processing unit 74, a grafted seedling delivery unit 4 that delivers a grafted seedling obtained by joining the stock seedling and the scion seedling, extending ahead from the front of the grafting processing unit 74. The grafting processing unit 74 receives the stock seedling and the scion seedling from lateral conveyance holding arms (not shown) respectively conveying the stock seedling and the scion seedling in the cell trays from the left and right loading units in a transversal manner. The grafting processing unit 74 cuts the stock seedling and the scion seedling and joins them to obtain a grafted seedling, and fixes the grafted seedling with a clip received from the clip supply unit 74a. The grafted seedling obtained in this manner is then delivered from the grafted seedling delivery unit 4.

(Grafting Processing Unit)

Figure 23A:
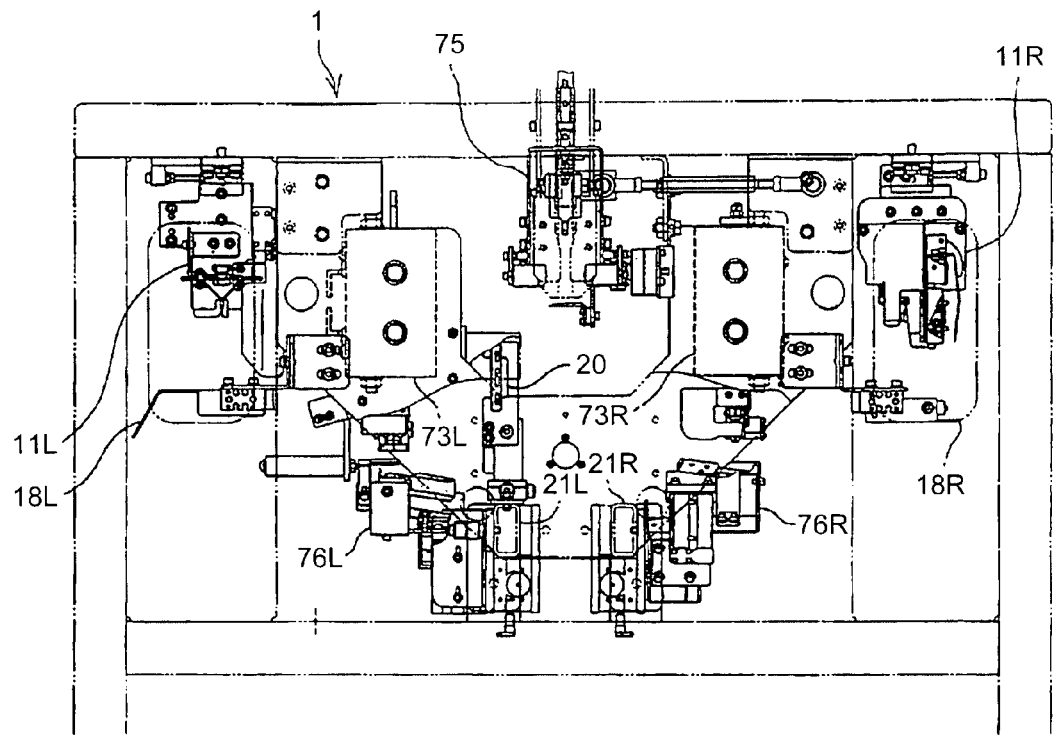
FIG. 23A is a plan view of relevant parts of a grafted seedling processing unit with a protected cover removed.
Figure 23B:
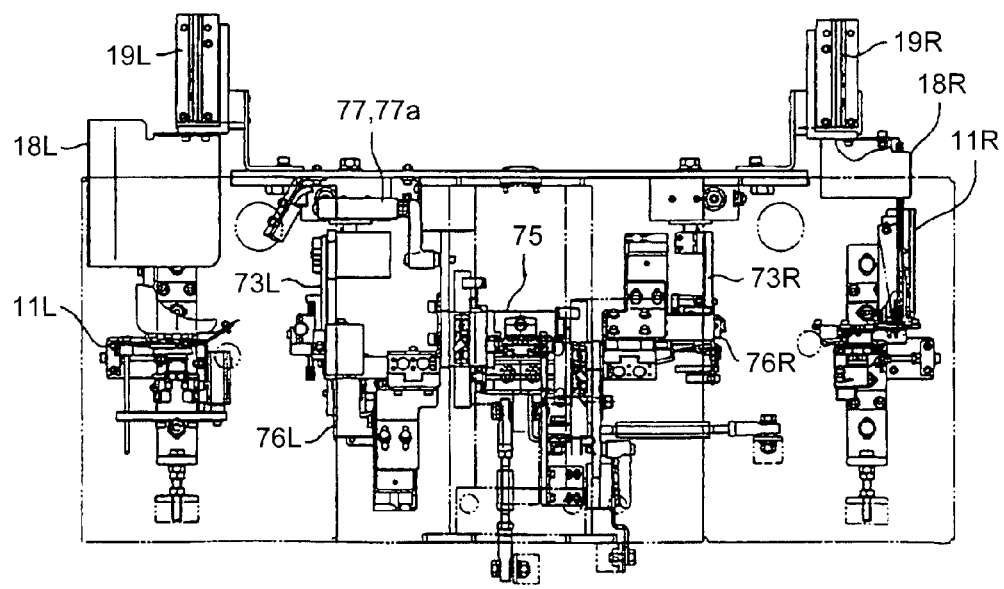
FIG. 23B is a front view of the relevant parts of the grafted seedling processing unit with the protected cover removed.

As shown in a plan view and a front view of relevant parts of FIGS. 23A and 23B, respectively, in which a grafted seedling processing unit having a protected cover removed is shown, the grafting processing unit 74 according to the present embodiment has a stock handling unit on its left half side and a scion handling unit on its right half side, including left and right seedling supply bases 11L and 11R at left and right side end portions, which receive and hold a stock seedling and a scion seedling from the loading units 2 and 2 via a transversal conveying mechanism (not shown), respectively, a joining unit 75 that joins and fixes the stock and the scion at the center position with a clip received from the clip supply unit 74a on the rear side, rotary conveying units 73L and 73R that respectively serve as left and right seedling holding devices using left and right rotary arms that rotate to convey the seedlings each including a conveying arm 73a for pinching the seedling from each of the seedling supply bases 11L and 11R to the joining unit 75, and left and right cutting units 76L and 76R arranged at a front end portion of the grafting processing unit 74, each employs a cutter that is installed in the rotating trip to perform a cutting operation. Furthermore, a roller arm 77 for pressing the cotyledon is provided above the left cutting unit 76L for the stock. Reference numerals 18L and 18R indicate second aligning plates, reference numerals 19L and 19R indicate hoist cylinders, and reference numeral 20 indicates a root cutting device.

(Cutting Unit)

Figure 24A:
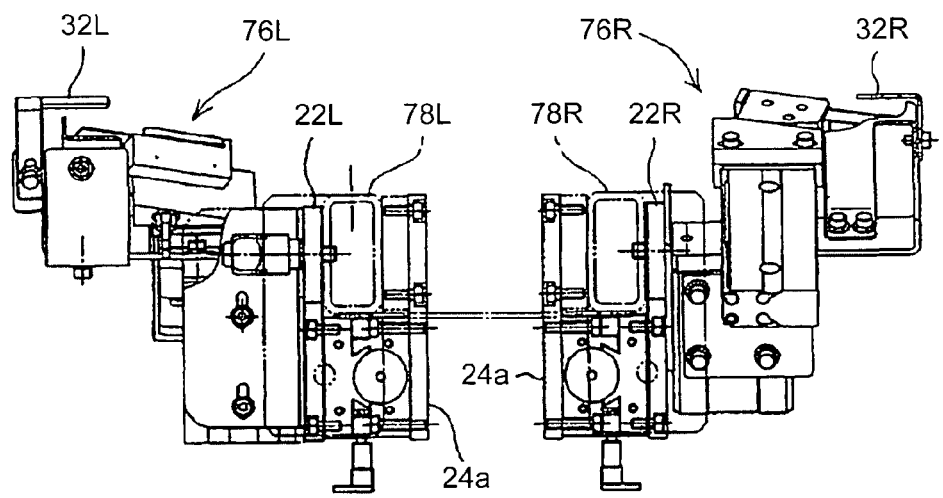
FIG. 24A is a plan view of cutting units.
Figure 24B:
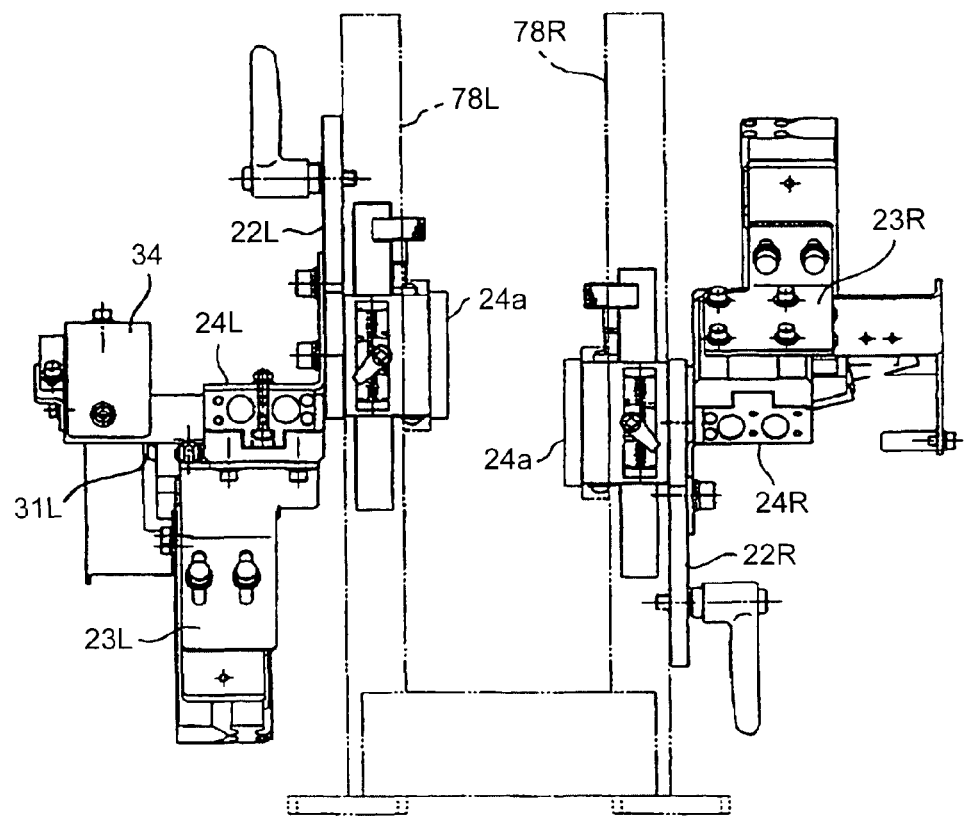
FIG. 24B is a front view of the cutting units.

As shown in a plan view and a side view of FIGS. 24A and 24B, respectively, the left and right cutting units 76L and 76R respectively include cutter bases 22L and 22R respectively mounted on two supporting pillars 78L and 78R that are standing at left and right sides, cutter units 23L and 23R each performing a cutting operation in a predetermined cutter trajectory, and slide supporting units 24L and 24R that respectively perform back-and-forth moving operations of the cutter units 23L and 23R for every cutting operation.

Figure 25:
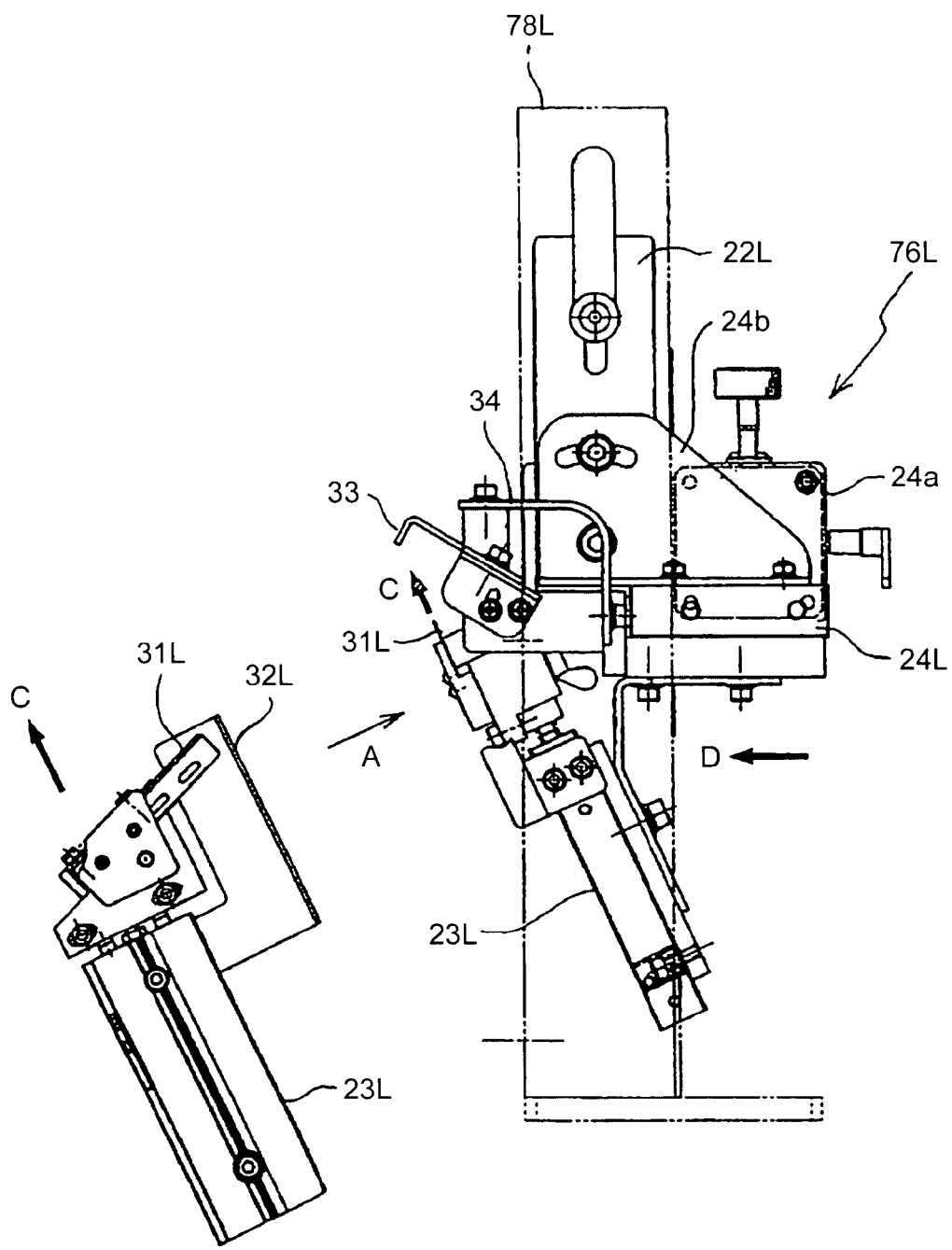
FIG. 25 is a side view of a left cutting unit with a view in a direction of an arrow A.

To explain each of the left and right cutting units 76L and 76R in detail, as shown in a side view in a direction of an arrow A of FIG. 25, in the left cutting unit 76L for cutting the stock seedling on one side, the cutter unit 23L for the stock includes a blade 31L in a razor shape arranged at its end, which performs a cutting operation in a cutter trajectory C for the stock in a straight line inclined toward the rotary conveying unit 73L for the stock at the back side and a pressing member 32L for the stock, which presses a cutting target at an advance position where the cutter unit 23L is advanced by the slide supporting unit 24L that serves as a supporting unit for the stock to perform the cutting operation.

The pressing member 32L is arranged at a position ahead of a cutting portion of the cutting target that is held by the rotary conveying unit 73L, that is, a position to press and fix a portion exceeding a crossing portion of the cutter trajectory. The slide supporting unit 24L is configured with a height adjusting unit 24a and an angle adjusting unit 24b to adjust a height position and an advance direction D of the cutter unit 23L. The roller arm 77 is configured to interlock and rotate by a rotary actuator to press the cotyledon with a sponge roller 77a from above corresponding in response to a cutting operation of the cutter unit 23L.

A leaf blowing guide 33 of a leaf spring shape to receive an unnecessary leaf that is cut and to blow the unnecessary leaf in a predetermined direction and a transparent cover 34 to protect a cylinder near a point of fall of the leaf are provided on an opposite side to the cutting target across the blade 31L, to prevent the leaf from entering into the cylinder and to have a visual contact with an operation of the cylinder. The leaf blowing guide 33 is more inclined than the cutting trajectory of the blade 31L from the embryonic stem of the seedling, and discharges the unnecessary leaf from the cutting trajectory obliquely downward on the opposite side to the leaf blowing guide 33 by receiving a part of unnecessary leaves moving in a cutting direction (an upper direction) by the cutting.

Figure 26:
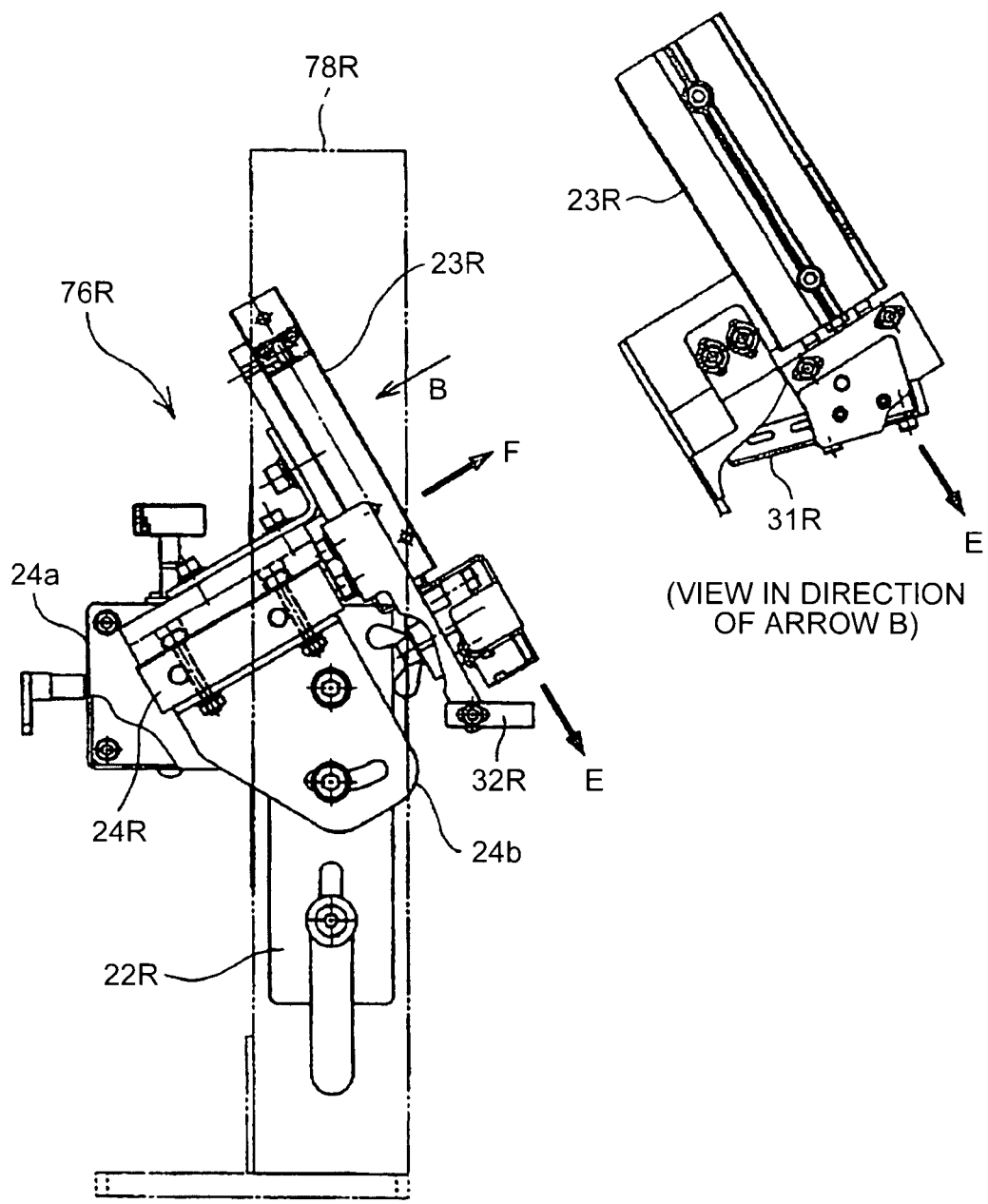
FIG. 26 is a side view of a right cutting unit with a view in a direction of an arrow B.

As shown in the side view in a direction of an arrow B in FIG. 26, in the right cutting unit 76R for cutting the scion seedling on the other side, the cutter unit 23R for the scion includes a blade 31R in a razor shape arranged at its end, which performs a cutting operation in a cutter trajectory E for the scion in a straight line inclined toward the rotary conveying unit 73R for the scion at the back side and a pressing member 32R for the scion, which presses a cutting target at an advanced position where the cutter unit 23R is advanced by the slide supporting unit 24R that serves as a supporting unit for the scion to perform the cutting operation.

The pressing member 32R is arranged at a position ahead of a cutting portion of the cutting target that is held by the rotary conveying unit 73R, that is, a position to press and fix a portion exceeding a crossing portion of the cutter trajectory. The slide supporting unit 24R is configured with a height adjusting unit 24a and an angle adjusting unit 24b to adjust a height position and an advance direction F of the cutter unit 23R.

Figure 27A:
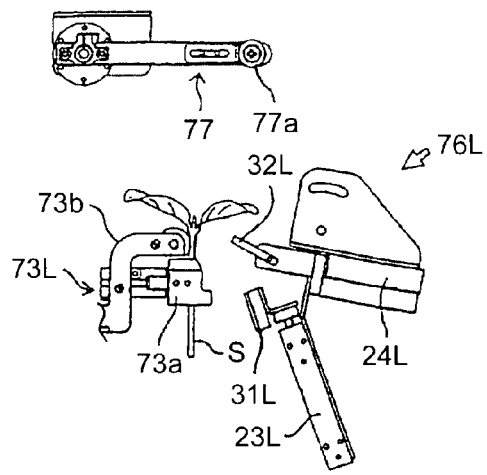
FIGS. 27A to 27E are schematic diagrams for explaining an operation of a cutting unit for a stock seedling.
Figure 27B:
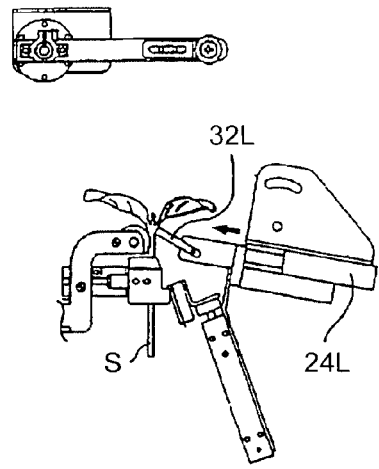
Figure 27C:
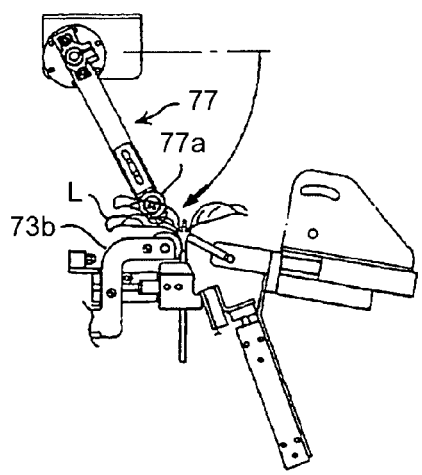
Figure 27D:
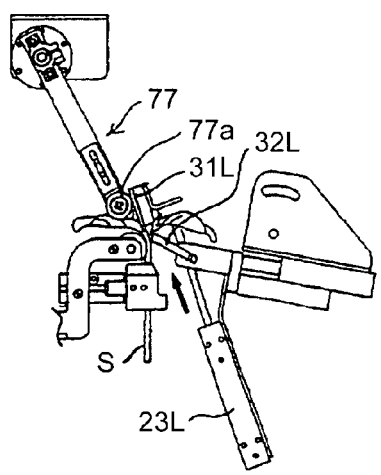
Figure 27E:
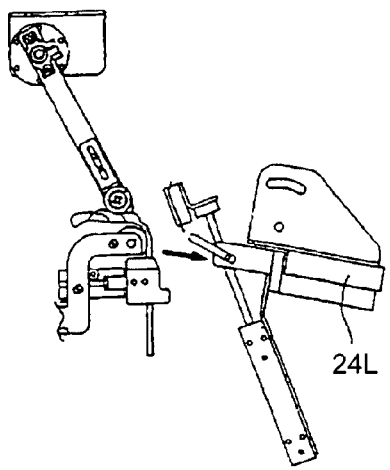
Figure 28A:
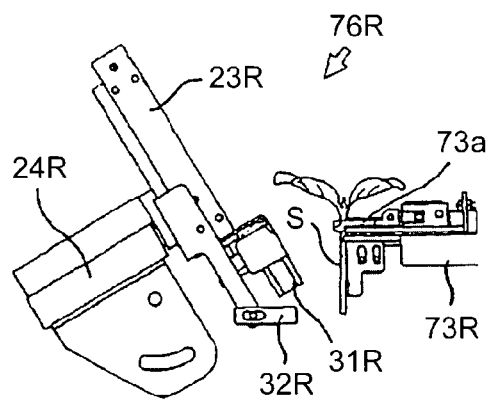
FIGS. 28A to 28D are schematic diagrams for explaining an operation of a cutting unit for a scion seedling.
Figure 28B:
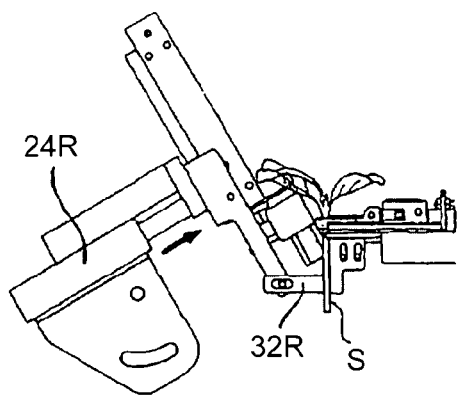
Figure 28C:
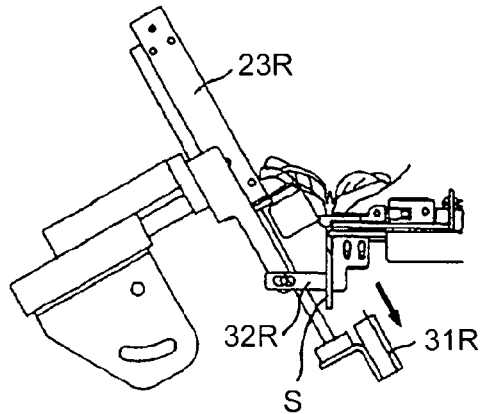
Figure 28D:
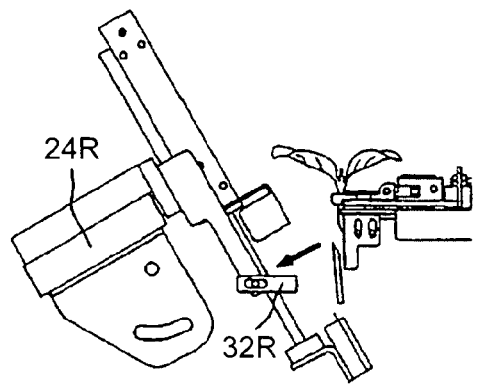

A cutting operation of each of the left and right cutting units 76L and 76R is explained in detail. As shown in schematic diagrams of FIGS. 27A to 27E for explaining an operation of the cutting unit 76L for the stock seedling, at a step 1 (FIG. 27A), the rotary conveying unit 73L is positioned to make the seedling in the conveying arm 73a reach the cutter unit 23L at a retracted position, at a step 2 (FIG. 27B), the cutter unit 23L is advanced to an advance position by the slide supporting unit 24L so that the pressing member 32L is positioned at a portion ahead of the cutting position, at a step 3 (FIG. 27C), the cotyledon is pressed against an embryonic stem receiving portion 73b by a rotation of the sponge roller 77a of the roller arm 77, at a step 4 (FIG. 27D), the blade 31L of the cutter unit 23L cuts the crossing portion of the cutter trajectory of the embryonic stem, and at a step 5 (FIG. 27E), the cutter unit 23L is retracted by the slide supporting unit 24L, by which the cutting operation is completed.

As shown in schematic diagrams of FIGS. 28A to 28D for explaining an operation of the cutting unit 76R for the scion seedling, at a step 1 (FIG. 28A), the rotary conveying unit 73R is positioned to make the seedling in the conveying arm 73a reach the cutter unit 23R at a retracted position, at a step 2 (FIG. 28B), the cutter unit 23R is advanced to an advance position by the slide supporting unit 24R so that the pressing member 32R is positioned at a portion ahead of the cutting position, at a step 3 (FIG. 28C), the blade 31R of the cutter unit 23R cuts the crossing portion of the cutter trajectory of the embryonic stem, and at a step 4 (FIG. 28D), the cutter unit 23R is retracted by the slide supporting unit 24R, by which the cutting operation is completed.

In this manner, the cutter units 23L and 23R can be advanced and retracted via the slide supporting units 24L and 24R, respectively, and by performing cutting operations of the predetermined cutting trajectories C and E at the advance positions, respectively, cuts portions where the embryonic stems cross the cutter trajectories for the seedlings pinched by the rotary conveying units 73L and 73R reaching the cutter units 23L and 23R, respectively. At this time, the pressing members 32L and 32R are advanced by the advance operations of the cutter units 23L and 23R, and by the pressing members 32L and 32R pressing the portions ahead of the cutting positions of the seedlings pinched by the rotary conveying units 73L and 73R against the holding sides, the cutting targets are positions and cut.

Therefore, in the cutting device for the grafted seedling processing, because the portions ahead of the cutting positions of the embryonic stems of the seedlings held by the seedling holding device composed of the rotary conveying units 73L and 73R are positioned by the pressing members 32L and 32R, respectively, and the blades 31L and 31R of the cutter units perform the cutting operations for cutting the embryonic stem S between the seedling holding device and the pressing portion, it is possible to form cutting planes with a high precision along the cutting trajectories C and E. As a result, because the cutting planes of the stock and the scion can be matched in an accurate manner at the time of joining them, it is possible to avoid the joining failure of the grafted seedling and to increase the proportion of grafted seedlings with satisfactory joining.

(Scion Seedling Supply Base)

Figure 29A:
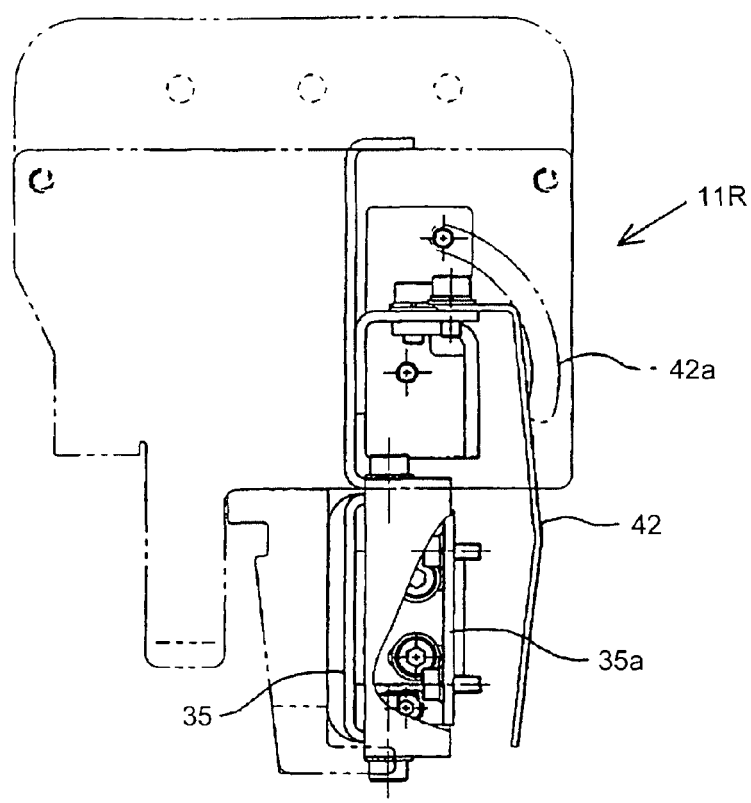
FIG. 29A is an enlarged plan view of a seedling supply base upper unit for the scion seedling.
Figure 29B:
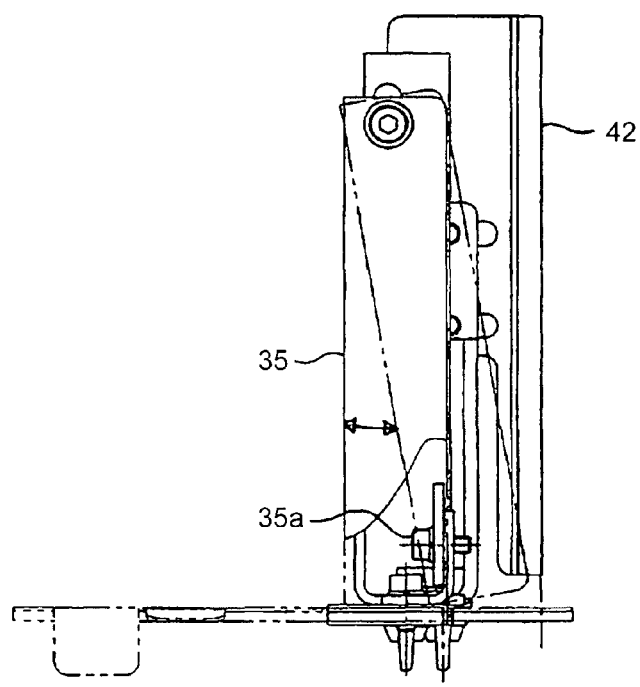
FIG. 29B is a front view of a seedling supply base lower unit for the scion seedling.

As shown in an enlarged plan view and a front view of FIGS. 29A and 29B, in the seedling supply base 11R for the scion seedling on the right side, by providing a weight 35a on a shutter 35 that moves when opening and closing the arm, it is possible to adjust the shutter 35 to the seedling according to a size of the cotyledon of the seedling by making the shutter 35 rotate around an upper supporting point against a gravitational force of the weight 35a when aligning the seedling by correcting a direction of the cotyledon by bringing the cotyledon into contact with the shutter 35. When there is no seedling supplied or when it is not necessary to rotate the shutter 35 because the cotyledon is too small, the shutter 35 is returned to a desired setting position by the weight 35a. The weight of the weight 35a can be adjusted by removing or changing the weight 35a depending on the strength or type of the seedling.

Further, in a control of the direction of the cotyledon performed when the scion seedling is delivered to the seedling supply base 11R, for example, it is necessary to perform the cotyledon alignment in different directions with an angle difference of 90 degrees for a watermelon and a cucumber, the direction of the cotyledon is aligned between an aligning plate 42 provided on the seedling supply base 11R and a second aligning plate 18R provided in a grafting device that performs an up-and-down operation (see FIGS. 23A and 23B) for the watermelon, and the direction of the cotyledon is aligned by a contact of the aligning plate 42 of the seedling supply base 11R with an R portion, where its switching can be set on an operation panel.

Specifically, when aligning the direction of the cotyledon with both the second aligning plate 18R and the aligning plate 42 for, for example, a watermelon seedling, the direction of the cotyledon is preliminarily corrected to face the lateral direction by making the cotyledon of the seedling have a contact with the second aligning plate 18R at an end of the lateral movement of the transversal conveyance holding arm, and the direction of the cotyledon of the seedling is aligned by a plurality of times of contacts of the cotyledon with the aligning plate 42 with a longitudinal back-and-forth movement of the holding arm after that.

When aligning the direction of the cotyledon only with the aligning plate 42 for, for example, a cucumber or a melon, a seeding is performed in advance in such a manner that the cotyledon of the seedling faces a longitudinal direction of a cell tray. Because a raised seedling substantially faces the longitudinal direction of the cell tray, the direction of the cotyledon of the seedling is aligned by hoisting up the second aligning plate 18R by an operation of the hoist cylinder (see FIGS. 23A and 23B. FIG. 23B depicts the second aligning plate at a retracted position.), thus retracting the second aligning plate 18R from a conveying area of the seedling by a lateral movement of the holding arm, and bringing the cotyledon into contact with the shutter 35 a plurality of times by the longitudinal back-and-forth movement of the holding arm. The second aligning plate 18R can be switched between an operation position and a retracted position by operating the hoist cylinder 19R on an operation panel.

As for a swinging operation in a postural control when delivering the seedling to the seedling supply base, the seedling is subject to the postural control focusing on a height direction for the scion and a direction of the cotyledon for the stock. Therefore, because the number of necessary swings is different for each of the left and right seedling supply bases 11L and 11R, the number of swings can be set separately on the operation panel.

When receiving the seedling, that is, aligning the direction of the cotyledon, by setting lower portions of the aligning plates of the left and right seedling supply bases 11L and 11R as seedling sides (the transversal conveyance holding arm side) and inclining upper portions to be located on the opposite sides, the configuration can be taken such that a tolerance of the direction of the cotyledon of the seedling is decreased by the seedling moving downward (the height control is performed) as a repetition of the swing operation. With this configuration, the cotyledon of the seedling can be aligned to a desired direction gradually with the repetition of the swing operation, so that it is possible to prevent the seedling from being damaged by a sudden change of the direction of the cotyledon of the seedling at the aligning plate.

As shown in a side view of a cross-section cut in a line S1-S1 of FIG. 30, the seedling supply base 11R for the scion seedling is configured with a supply arm 36 and an auxiliary arm 37, so that after the swing operation of the transversal conveyance holding arm, the supply arm 36 and the auxiliary arm 37 hold the seedling supplied to the seedling supply base 11R from the transversal conveyance holding arm, and in order to convey the seedling by the rotary conveying unit 73R, the holding of the supply arm 36 and the auxiliary arm 37 is released at the time when the rotary conveying unit 73R starts to be stretched to hold the seedling. Therefore, because the posture of the seedling becomes improper from the release of the supply arm 36 and the auxiliary arm 37 until the holding arm of the rotary conveying unit 73R holds the seedling, there is a possibility that the position of the embryonic stem becomes misaligned.

To handle this problem, a scion seedling guide 38 to control the posture of the seedling is provided, such that the position of the embryonic stem is kept aligned when the holding arm of the rotary conveying unit 73R receives the seedling (the auxiliary arm 37 is opened to deliver the seedling). The scion seedling guide 38 becomes in an active state when the rotary conveying unit 73R faces the seedling supply base 11R before the arm holds the seedling, in an inactive state when the rotary conveying unit 73R completely moves away from the seedling supply base 11R portion after holding the seedling, so that the scion seedling guide 38 becomes active from the opposite side to the rotary conveying unit 73R on the seedling without affecting the conveyance of the seedling by the rotary conveying unit 73R and becomes inactive when the seedling is supplied from the transversal conveyance holding arm to the seedling supply base 11R without affecting the supply of the seedling.

As shown in a side view and a front view of FIGS. 31A and 31B, respectively, the seedling supply base 11L for the stock seedling includes a pair of pull-down arms 39 and a pull-down mechanism for aligning the height of the seedling by engaging a cylinder 63 with a plate 40. A speed of pulling down and a resistance applied to the seedling at the time of pull-down are kept constant by providing a pull-down guide 64 on the opposite side to the cylinder 63 in proximity across the stock seedling. Because the cylinder 63 is provided on the clip supply unit 74a side in opposite to the stock seedling supplied to the seedling supply base 11L, it is possible to avoid an interruption with the transversal conveyance holding arm that supplies the seedling to the seedling supply base 11L by moving from the other side.

(Rotary Conveying Unit)

As shown in a front view and a side view of FIGS. 32A and 32B, respectively, the rotary conveying unit 73L includes a seedling guide 72 that can be stretched and retracted by a cylinder 72a down the conveying arm 73a. The seedling guide 72 serves as a positioning guide for the seedling by having a contact with the embryonic stem of the seedling when receiving the seedling from the seedling supply base 11L in a stretched state, a member for preventing bending of the embryonic stem of the seedling and a position misalignment when cutting the seedling in a state of having a contact with the embryonic stem, and a bumping plate for preventing the embryonic stem of the seedling from separating when cutting the root. The seedling guide 72 becomes in a retracted state when joining the seedlings and moves away from the seedling.

(Joining Unit)

Figure 33A:
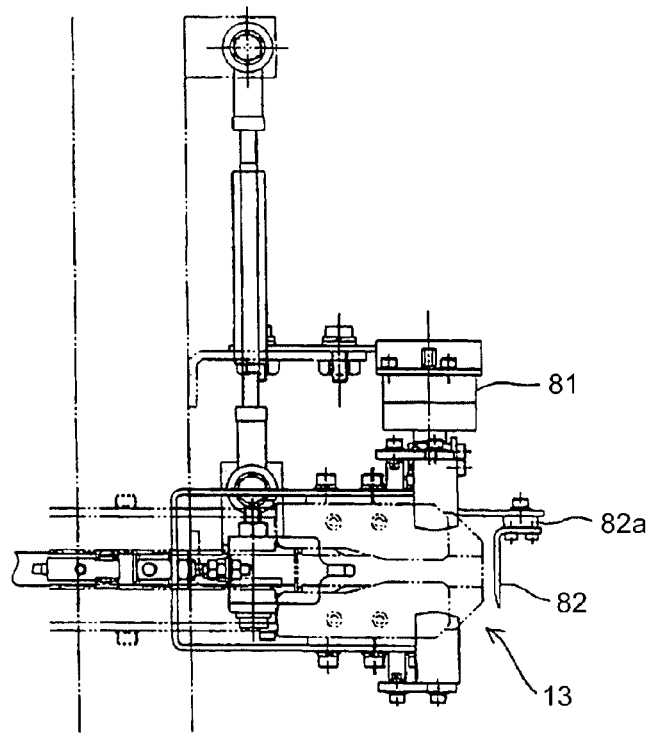
FIG. 33A is a plan view of a joining unit.
Figure 33B:
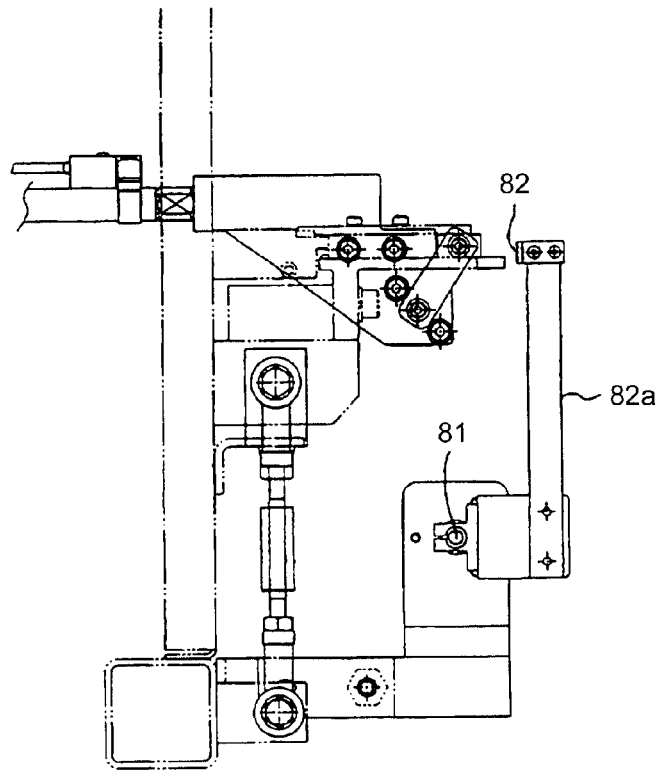
FIG. 33B is a side view of the joining unit.

As shown in a plan view and a side view of FIGS. 33A and 33B, respectively, the joining unit 75 includes a guide 82 for correction and prevention (on the opposite side to the root cutting device 20 for the stock seedling (see FIGS. 23A and 23B)) provided from the scion side that becomes a reference for a joining center. The guide 82 can be operated via a pressing plate 82a that receives a rotation of a rotary actuator 81. The guide 82 is brought into contact with a distal end of a supplied clip, so that a correction guide is formed, which corrects and prevents a position misalignment of the seedling and the clip when applying the clip on the seedlings.

The present invention has the following effects.

According to the invention of claim 1, because the stock cutter unit performs a cutting operation by a predetermined stock cutter trajectory, the embryonic stem of the stock seedling is cut at a portion that crosses the stock cutter trajectory by pinching and holding the seedling with the stock seedling holding unit reaching the stock cutter unit, and the stock cutter unit can move back and forth via the supporting unit for the stock and presses a portion ahead of the cutting position of the embryonic stem extending from the stock seedling holding unit by the stock pressing member at the advance position, to position the seedling by pressing the embryonic stem against the stock seedling holding unit side. Therefore, because the portion ahead of the cutting position of the embryonic stem of the stock seedling held by the stock seedling holding unit is positioned by the stock pressing member with an advance operation of the stock cutter unit, and the stock cutter unit performs the cutting operation on the embryonic stem between the stock seedling holding unit and the pressing portion of the stock, it is possible to form a highly precise cutting plane along the stock cutter trajectory. As a result, because the cutting planes can be matched in an accurate manner when joining the stock and the scion, it is possible to increase the proportion of grafted seedlings with satisfactory joining by preventing a joining failure of the grafted seedling.

According to the invention of claim 2, because the scion cutter unit performs a cutting operation by a predetermined scion cutter trajectory, the embryonic stem of the scion seedling is cut at a portion that crosses the scion cutter trajectory by pinching and holding the seedling with the scion seedling holding unit reaching the scion cutter unit, and the scion cutter unit can move back and forth via the supporting unit for the scion and presses a portion ahead of the cutting position of the embryonic stem extending from the scion seedling holding unit by the scion pressing member at the advance position, to position the seedling by pressing the embryonic stem against the scion seedling holding unit side. Therefore, because the portion ahead of the cutting position of the embryonic stem of the scion seedling held by the scion seedling holding unit is positioned by the scion pressing member with an advance operation of the scion cutter unit, and the scion cutter unit performs the cutting operation on the embryonic stem between the scion seedling holding unit and the pressing portion of the scion, it is possible to form a highly precise cutting plane along the scion cutter trajectory. As a result, because the cutting planes can be matched in an accurate manner when joining the stock and the scion, it is possible to increase the proportion of grafted seedlings with satisfactory joining by preventing a joining failure of the grafted seedling.

According to the invention of claim 2, in addition to the effects of the inventions according to claim 1, because the stock seedling is cut by an upward movement of the blade on the stock cutter trajectory in an inclined straight line shape, and the scion seedling is cut by a downward movement of the blade on the scion cutter trajectory in an inclined straight line shape, it is possible to form a further highly precise cutting plane along the straight line-shaped stock cutter trajectory and scion cutter trajectory. As a result, because the cutting planes can be matched in a further accurate manner when joining the stock and the scion, it is possible to increase the proportion of grafted seedlings with satisfactory joining by preventing a joining failure of the grafted seedling.

According to the invention of claim 3, in addition to the effects of the invention according to claim 1 or 2, because the unnecessary leaf can be discharged to the opposite side to the leaf blowing guide from the cutting trajectory, it is possible to increase the proportion of grafted seedlings with satisfactory joining by further preventing a joining failure of the grafted seedling.

According to the invention of claim 4, in addition to the effects of the invention according to any one of claims 1 to 3, because the correction and prevention guide can correct and prevent a position misalignment of the seedling and the clip by having a contact with a distal end of the clip supplied from the clip supply unit, it is possible to increase the proportion of grafted seedlings with satisfactory joining by further preventing a joining failure of the grafted seedling.

According to the invention of claim 5, in addition to the effects of the invention according to any one of claims 1 to 4, the scion seedling and the stock seedling can be supplied to the main unit after correcting the direction of the cotyledon of the seedling by the shutter. Furthermore, it is possible to adjust the shutter to the seedling according to a size of the cotyledon of the seedling by making the shutter rotate around an upper supporting point against a gravitational force of the weight. In addition, when there is no seedling supplied or when it is not necessary to rotate the shutter 35 because the cotyledon is too small, it is possible to return the shutter to a desired setting position by the weight. Therefore, it is possible to increase the proportion of grafted seedlings with satisfactory joining by further preventing a joining failure of the grafted seedling.

According to the invention of claim 6, in addition to the effects of the invention according to any one of claims 1 to 6, when aligning the direction of the cotyledon with both the aligning plates for, for example, a watermelon seedling, the direction of the cotyledon is preliminarily corrected by making the cotyledon of the seedling have a contact with the second aligning plate, and the direction of the cotyledon of the seedling is aligned by a contact of the cotyledon with the aligning plate with a movement of the holding arm after that. On the other hand, when aligning the direction of the cotyledon only with the aligning plate for, for example, a cucumber or a melon, it is possible to align the direction of the cotyledon of the seedling by hoisting up the second aligning plate by an operation of the hoist cylinder, thus retracting the second aligning plate from a conveying area of the seedling by a movement of the holding arm, and bringing the cotyledon into contact with the shutter by the movement of the holding arm. Therefore, it is possible to increase the proportion of grafted seedlings with satisfactory joining by further preventing a joining failure of the grafted seedling.

According to the invention of claim 7, in addition to the effects of the invention according to any one of claims 1 to 6, because the number of swings of the holding arm can be set differently for the stock side and the scion side, it is possible to perform a postural control of the seedling focusing on a height direction for the scion and a direction of the cotyledon for the stock. Therefore, it is possible to increase the proportion of grafted seedlings with satisfactory joining by further preventing a joining failure of the grafted seedling.

According to the invention of claim 8, in addition to the effects of the invention according to any one of claims 1 to 7, a tolerance of the direction of the cotyledon of the seedling is decreased by the seedling moving downward as a repetition of the swing operation when aligning the direction of the cotyledon of the seedling, and it is possible to align the cotyledon of the seedling to a desired direction gradually with the repetition of the swing operation, so that it is possible to prevent the seedling from being damaged by a sudden change of the direction of the cotyledon of the seedling at the aligning plate. Therefore, it is possible to increase the proportion of grafted seedlings with satisfactory joining by further preventing a joining failure of the grafted seedling.

According to the invention of claim 9, in addition to the effects of the invention according to any one of claims 2 and 4 to 8, because the scion seedling guide becomes active from the opposite side to the scion seedling holding unit on the scion seedling without affecting the conveyance of the seedling by the scion seedling holding unit and becomes inactive when the scion seedling is supplied to the scion seedling supply base without affecting the supply of the seedling, it is possible to prevent the position of the embryonic stem from being misaligned from an improper posture of the seedling from the release of the supply arm and the auxiliary arm until the holding arm of the scion seedling holding unit holds the seedling. Therefore, it is possible to increase the proportion of grafted seedlings with satisfactory joining by further preventing a joining failure of the grafted seedling.

According to the invention of claim 10, in addition to the effects of the invention according to any one of claims 1 to 9, the seedling guide can serve as a positioning guide for the seedling by having a contact with the embryonic stem of the stock seedling when receiving the stock seedling from the stock seedling supply base in a stretched state, a member for preventing bending of the embryonic stem of the seedling and a position misalignment when cutting the seedling in a state of having a contact with the embryonic stem, and a bumping plate for preventing the embryonic stem of the seedling from separating when cutting the root, and to become in a retracted state when joining the seedlings and move away from the seedling. Therefore, it is possible to increase the proportion of grafted seedlings with satisfactory joining by further preventing a joining failure of the grafted seedling.

What is claimed is:

1. A grafted seedling producing device including a stock seedling holding unit that holds and conveys a stock seedling, a stock cutting unit that cuts the stock seedling held by the stock seedling holding unit, and a joining unit that joins the stock seedling conveyed by the stock seedling holding unit and a scion seedling, the stock cutting unit including a stock cutter unit that includes a stock blade for cutting the stock seedling by a predetermined stock cutter trajectory, the stock seedling holding unit holding an embryonic stem of a seedling for grafting at a predetermined position on the stock cutter trajectory in a vertical posture, the grafted seedling producing device comprising:
    a supporting unit configured to retract the stock cutter unit from an advance position for cutting in proximity to the stock seedling holding unit; and
    a stock pressing member that presses and fixes a portion ahead of a cutting position of the embryonic stem from a seedling holding position against the stock seedling holding unit side at the advance position.

2. The grafted seedling producing device according to claim 1, further comprising a second grafted seedling producing device including a scion seedling holding unit that holds and conveys a scion seedling, a scion cutting unit that cuts the scion seedling held by the scion seedling holding unit, and a joining unit that joins the scion seedling conveyed by the scion seedling holding unit and a stock seedling, the scion cutting unit including a scion cutter unit that includes a scion blade for cutting the scion seedling by a predetermined scion cutter trajectory, the scion seedling holding unit holding an embryonic stem of a seedling for grafting at a predetermined position on the scion cutter trajectory in a vertical posture, the second grafted seedling producing device including:
    a supporting unit configured to retract the scion cutter unit from an advance position for cutting in proximity to the scion seedling holding unit; and
    a scion pressing member that presses and fixes a portion ahead of a cutting position of the embryonic stem from a seedling holding position against the scion seedling holding unit side at the advance position, wherein each of the stock cutting unit and the scion cutting unit is configured to cut the embryonic stem at a portion near the seedling holding position, in the stock cutting unit, the stock blade cuts the embryonic stem by an upward movement on the stock cutter trajectory in an inclined straight line shape, and in the scion cutting unit, the scion blade cuts the embryonic stem by a downward movement on the scion cutter trajectory in an inclined straight line shape.

3. The grafted seedling producing device according to claim 2, further comprising a scion seedling supply base that is configured with a supply arm on an upper side and an auxiliary arm on a lower side for holding the seedling, wherein a holding of the supply arm and the auxiliary arm is configured to be released at a time when the scion seedling holding unit starts to be stretched to hold the seedling, the grafted seedling producing device further comprises a scion seedling guide that keeps a position of the embryonic stem from being misaligned from a release of the holding of the holding of the supply arm and the auxiliary arm until the scion seedling holding unit holds the scion seedling, the scion seedling guide is configured to become active from an opposite side to the scion seedling holding unit on the seedling before the scion seedling holding unit holds the scion seedling, an inactive when the scion seedling holding unit completely moves away from the scion seedling supply base after holding the scion seedling.

4. The grafted seedling producing device according to claim 1, wherein the stock seedling holding unit includes an arm that presses a cotyledon from above on an embryonic stem receiving portion, and a leaf blowing guide that receives and blows an unnecessary leaf that is cut by the stock blade of the stock cutting unit.

5. The grafted seedling producing device according to claim 1, wherein the joining unit is configured to join the stock seedling and the scion seedling with a clip supplied from a clip supply unit, and the joining unit includes a correction and prevention guide that performs an operation of correcting and preventing a position misalignment of the seedling and the clip by having a contact with a distal end of the clip supplied from the clip supply unit.

6. The grafted seedling producing device according to claim 1, further comprising a loading unit for loading the stock seedling or a loading unit for loading the scion seedling, wherein the loading unit includes a conveying mechanism that conveys a cell tray in which a plurality of seedlings are arranged sequentially by an arrangement pitch, a holding arm that fetches a seedling conveyed by the conveying mechanism, and a lateral conveying mechanism that moves the holding arm, the holding arm holds an embryonic stem of the seedling in a state of having a space for accommodating it in a rotatable manner, the lateral conveying mechanism is configured to supply the seedling held by the holding arm to a main unit for grafting the scion seedling and the stock seedling, the grafted seedling producing device further comprises:

a supply arm that receives the seedling from the holding arm; and a shutter that corrects a direction of a cotyledon of the seedling with a swing operation of the holding arm when the supply arm receives the seedling, and the shutter includes a weight and is configured to rotate around an upper supporting point, being provided at a position where the shutter moves by opening and closing of the holding arm.

7. The grafted seedling producing device according to claim 1, further comprising a loading unit for loading the stock seedling or a loading unit for loading the scion seedling, wherein the loading unit includes a conveying mechanism that conveys a cell tray in which a plurality of seedlings are arranged sequentially by an arrangement pitch, a holding arm that fetches a seedling conveyed by the conveying mechanism, and a lateral conveying mechanism that moves the holding arm, the holding arm holds an embryonic stem of the seedling in a state of having a space for accommodating it in a rotatable manner, the lateral conveying mechanism is configured to supply the seedling held by the holding arm to a main unit for grafting the scion seedling and the stock seedling, the grafted seedling producing device further comprises:

a supply arm that receives the seedling from the holding arm; and an aligning plate and a second aligning plate for aligning a direction of a cotyledon of the seedling with a swing operation of the holding arm when the supply arm receives the seedling, and when aligning the direction of the cotyledon of the seedling exclusively with the aligning plate, the grafted seedling producing device further comprises a hoist cylinder that retracts the second aligning plate from a conveying area of the seedling by the holding arm.

8. The grafted seedling producing device according to claim 1, further comprising a loading unit for loading the stock seedling and a loading unit for loading the scion seedling, wherein the loading unit includes a conveying mechanism that conveys a cell tray in which a plurality of seedlings are arranged sequentially by an arrangement pitch, a holding arm that fetches a seedling conveyed by the conveying mechanism, and a lateral conveying mechanism that moves the holding arm, the holding arm holds an embryonic stem of the seedling in a state of having a space for accommodating it in a rotatable manner, the lateral conveying mechanism is configured to supply the seedling held by the holding arm to a main unit for grafting the scion seedling and the stock seedling, the grafted seedling producing device further comprises:

a supply arm that receives the seedling from the holding arm; and an aligning plate for aligning a direction of a cotyledon of the seedling with a swing operation of the holding arm when the supply arm receives the seedling, and number of swings of the holding arm is configured to be set separately for the stock side and the scion side.

9. The grafted seedling producing device according to claim 1, further comprising a loading unit for loading the stock seedling and a loading unit for loading the scion seedling, wherein the loading unit includes a conveying mechanism that conveys a cell tray in which a plurality of seedlings are arranged sequentially by an arrangement pitch, a holding arm that fetches a seedling conveyed by the conveying mechanism, and a lateral conveying mechanism that moves the holding arm, the holding arm holds an embryonic stem of the seedling in a state of having a space for accommodating it in a rotatable manner, the lateral conveying mechanism is configured to supply the seedling held by the holding arm to a main unit for grafting the scion seedling and the stock seedling, the grafted seedling producing device further comprises:

a supply arm that receives the seedling from the holding arm; and an aligning plate for aligning a direction of a cotyledon of the seedling with a swing operation of the holding arm when the supply arm receives the seedling, the aligning plate being arranged in an inclined manner with a lower portion on the holding arm side and an upper portion an opposite side to the holding arm.

10. The grafted seedling producing device according to claim 1, wherein the stock seedling holding unit includes a conveying arm and a seedling guide that can be stretched and retracted by a cylinder down the conveying arm, the seedling guide is configure to position the seedling by having a contact with the embryonic stem of the seedling when receiving the seedling from a stock seedling supply base in a stretched state, prevent bending of the embryonic stem of the seedling and a position misalignment when cutting the seedling in a state of having a contact with the embryonic stem, become a bumping plate for preventing the embryonic stem of the seedling from separating when cutting a root by a root cutting device, and move away from the seedling in a retracted state when joining the seedlings.

* * * * *